(12) United States Patent
Fujimori

(10) Patent No.: US 8,106,895 B2
(45) Date of Patent: Jan. 31, 2012

(54) IMAGE DISPLAY SYSTEM, IMAGE DISPLAY METHOD, INFORMATION PROCESSING APPARATUS, IMAGE DISPLAY DEVICE, CONTROL PROGRAM, AND RECORDING MEDIUM

(75) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 11/610,215

(22) Filed: Dec. 13, 2006

(65) Prior Publication Data

US 2007/0146556 A1 Jun. 28, 2007

(30) Foreign Application Priority Data

Dec. 13, 2005 (JP) .................................. 2005-358582

(51) Int. Cl.
*G06F 3/038* (2006.01)
*G06F 15/16* (2006.01)
*G09G 5/00* (2006.01)

(52) U.S. Cl. .......... 345/204; 345/1.2; 709/231; 709/232
(58) Field of Classification Search .................. 345/1.1, 345/1.2, 2.1, 596–605, 204, 104
See application file for complete search history.

(56) References Cited

U.S. PATENT DOCUMENTS

| 4,721,928 | A | * | 1/1988 | Yoshida | 332/104 |
| 4,876,657 | A | * | 10/1989 | Saito et al. | 715/753 |
| 5,986,648 | A | * | 11/1999 | Okada et al. | 345/204 |
| 6,771,278 | B2 | * | 8/2004 | Shigeta | 345/634 |
| 6,788,306 | B2 | * | 9/2004 | Yamaguchi et al. | 345/596 |
| 6,860,609 | B2 | | 3/2005 | Olson et al. | |
| 7,061,506 | B2 | | 6/2006 | Matsuda | |
| 7,224,404 | B2 | | 5/2007 | An et al. | |
| 7,245,307 | B2 | | 7/2007 | Matsuda | |
| 7,417,643 | B2 | | 8/2008 | Matsuda | |
| 2001/0048445 | A1 | | 12/2001 | Ikeno | |

(Continued)

FOREIGN PATENT DOCUMENTS

JP 08-179729 7/1996

(Continued)

OTHER PUBLICATIONS

Office Action issued in U.S. Appl. No. 11/774,157 on Jun. 16, 2010.

(Continued)

*Primary Examiner* — Bipin Shalwala
*Assistant Examiner* — Ilana Spar
(74) *Attorney, Agent, or Firm* — Oliff & Berridge, PLC

(57) ABSTRACT

An image display system includes an information processing apparatus that processes image information, an image display device that displays an image based on the image information processed by the information processing apparatus, and an information transmission device that connects the information processing apparatus and the image display device so as to enable information transmission and reception. A plurality of information transmission devices are provided. The information processing apparatus includes an information transmission control unit that divides processed image information so as to generate a plurality of division information to be then transmitted through the plurality of information transmission devices. The image display device includes an image information generation unit that generates the processed image information, and a display device-side display control unit that causes a display device-side display unit to display an image based on the processed image information generated.

8 Claims, 16 Drawing Sheets

U.S. PATENT DOCUMENTS

| | | | |
|---|---|---|---|
| 2004/0008159 A1* | 1/2004 | Cunha et al. | 345/30 |
| 2005/0235215 A1 | 10/2005 | Dunn et al. | |
| 2007/0040993 A1 | 2/2007 | Yokoyama et al. | |
| 2007/0146556 A1 | 6/2007 | Fujimori | |
| 2008/0055320 A1* | 3/2008 | Fujimori | 345/501 |

FOREIGN PATENT DOCUMENTS

| | | |
|---|---|---|
| JP | 2001-228850 | 8/2001 |
| JP | A-2001-337660 | 12/2001 |
| JP | A-2002-175068 | 6/2002 |
| JP | A-2002-300545 | 10/2002 |
| JP | A-2003-060986 | 2/2003 |
| JP | A 2004-69996 | 3/2004 |
| JP | 2004-147014 | 5/2004 |
| JP | A-2004-191454 | 7/2004 |
| JP | A-2004-341269 | 12/2004 |
| JP | 2005-079727 | 3/2005 |
| JP | 2005-150818 | 6/2005 |

OTHER PUBLICATIONS

Co-pending U.S. Appl. No. 11/774,157, filed Jul. 6, 2007; Fujimori, Toshiki.

Office Action issued in U.S. Appl. No. 11/774,157, dated Nov. 15, 2010.

Oct. 13, 2011 Office Action issued in U.S. Appl. No. 11/774,157.

* cited by examiner

| | | | | |
|---|---|---|---|---|
| HEADER | HEADER START DECLARATION | X-DIRECTION WRITE POSITION | X-DIRECTION WRITE LENGTH | Y-DIRECTION WRITE POSITION | Y-DIRECTION WRITE LENGTH |
| FIRST PIXEL | R1 | G1 | B1 | | |
| SECOND PIXEL | R2 | G2 | B2 | | |
| ... | | | | | |
| n-TH PIXEL (LAST PIXEL) | Rn | Gn | Bn | DATA END DECLARATION | |

IMAGE DISPLAY SYSTEM, IMAGE DISPLAY METHOD, INFORMATION PROCESSING APPARATUS, IMAGE DISPLAY DEVICE, CONTROL PROGRAM, AND RECORDING MEDIUM

BACKGROUND

1. Technical Field

The present invention relates to an image display system, an image display method, an information processing apparatus, an image display device, a control program, and a recording medium.

2. Related Art

There is known a projection system that includes a personal computer (hereinafter, referred to as PC) performing an image processing, such as shape correction or color correction of an video source, a projector projecting an image obtained through the image processing by the PC on a screen, and a serial cable, such as a USB (Universal Serial Bus) cable, connecting the PC and the projector for data transmission and reception (for example, see JP-A-2004-69996).

In the projector system described in JP-A-2004-69996, the image processing is primarily performed on the PC, and the projector simply projects the image, not performing a complex image processing. Accordingly, the configuration of the projector can be considerably simplified. Further, since the PC originally has a graphic processing function, a high definition image processing can be performed without adding a new function to the PC.

Here, for example, when the video source is a motion picture, if a transmission speed of the USB is low, it takes much time to transmit one image data. Then, a frame rate of a display image by the projector is delayed, and the motion picture is not appropriately played. For example, a frame rate of 30 frames/second is suitable for smoothly play the motion picture, but this frame rate cannot be realized at all to transmit the entire image data when the USB is used. While stable communication speed in the USB 2.0 is approximately 240 Mbps, when display resolution is XGA (1024×768 dots), the data quantity becomes approximately 25 Mbits in an image having color information of 30 bits per pixel. Then, the image data can be merely transmitted at a frame rate of 9 frames/second. Even though communication is temporarily performed at a theoretical maximum communication speed of 480 Mbps, a frame rate is nor more than 18 frames/second. Accordingly, this frame rate does not meet the play of the motion picture.

In the projection system described in JP-A-2004-699969, there is suggested a method that reduces the amount of required transmission data so as to keep a frame rate to an appropriate level by transmitting data with reduced resolution, compressing data and transmitting the compressed data, or transmitting differential data of previous screen data.

However, when the data is transmitted with reduced resolution or the data is compressed and transmitted, the image is degraded, and the projector cannot display a high-definition image.

Further, when the differential data is transmitted, there is a possibility that the reduction of the amount of the transmission data does not exhibit a sufficient effect according to the contents to be displayed. In particular when this method is used for the play of the motion picture having the frame rate as an important factor, a change in screen widely spreads for each frame, and thus a sufficient frame rate is not obtained.

Therefore, there is needed a technology that can smoothly perform the transmission of information and can realize a good image display state.

SUMMARY

An advantage of some aspects of the invention is that it, provides an image display system, an image display method, an information processing apparatus, an image display device, a control program, and a recording medium that can smoothly perform transmission of information and can realize a good image display state.

According to a first aspect of the invention, an image display system includes an information processing apparatus that processes image information, an image display device that displays an image based on the image information processed by the information processing apparatus, and an information transmission device that connects the information processing apparatus and the image display device so as to enable information transmission and reception. A plurality of information transmission devices are provided. The information processing apparatus includes a plurality of information transmitting units that are provided to correspond to the plurality of information transmission devices, and transmit information to the image display device through the plurality of information transmission devices, an image processing unit that performs a predetermined image processing on the image information, and an information transmission control unit that divides processed image information subjected to the image processing by the image processing unit so as to generate a plurality of division information, and allocates the plurality of division information to the plurality of information transmitting units to be then transmitted. The image display device includes a plurality of information receiving units that are provided to correspond to the plurality of information transmission devices, and receive the plurality of division information transmitted from the information processing apparatus through the plurality of Information transmission devices, an information storage unit that has a plurality of storage regions corresponding to the plurality of information receiving units, and stores the plurality of division information received by the plurality of information receiving units in the storage regions corresponding to the information receiving units, an image information generation unit that reads out the plurality of division information stored in the plurality of storage regions of the information storage unit, and generates the processed image information, and a display device-side display control unit that causes a display device-side display unit to display an image based on the processed image information generated by the image information generation unit.

Here, the information transmission device may include the standard for transmitting information through a wireless medium (electric wave, sound, or infrared ray), in addition to the standard for transmitting information in a wired manner, for example, through a USB cable or a LAN (Local Area Network, cable. Further, the standards of the plurality of information transmission devices are not particularly limited. For example, the standards may be identical or different.

Further, the information storage unit may be a single storage unit in which information is stored in a plurality of storage regions or a plurality of storage units that respectively stores information.

According to the above-described configuration, in the image display system, a plurality of information transmission devices are provided, and the information processing apparatus includes the plurality of information transmitting units, the image processing unit, and the information transmission control unit. Further, the image display device includes the plurality of information receiving units, the information storage unit, the image information generation unit, and the display device-side display unit. Accordingly, an image can be displayed on the image display device, as described below.

First, the information transmission processes the image information and transmits the processed image information, as described below.

That is, the image processing unit performs a predetermined image processing, for example, a shape correction processing or a color correction processing, on the image information.

The information transmission control unit divides processed image information subjected to the image processing by the image processing unit so as to generate a plurality of division information.

Then, the information transmission control unit allocates the plurality of generated division information to the plurality of information transmitting units, respectively, so as to transmit the plurality of division information to the image display device through the plurality of information transmission devices.

Next, the image display device receives and displays the information, as described below.

That is, the plurality of information receiving units receive the plurality of division information transmitted from the information processing apparatus through the plurality of information transmission devices.

The information storage unit stores the plurality of division information received by the plurality of information receiving units in storage regions corresponding to the in formation receiving units among a plurality of storage regions.

The image information generation unit reads out the plurality of division information stored in the plurality of storage regions and generates the processed image information subjected to the image processing by the image processing unit of the information processing apparatus.

Then, the processing apparatus-side display control unit controls driving of the processing apparatus-side display unit and causes the processing apparatus-side display unit to display the image based on the processed image information generated by the image information generation unit.

According to the above-described configuration, a plurality of information transmission devices are provided, and the information processing apparatus transmits the plurality of division information obtained by dividing the image information to the image display device through the plurality of information transmission devices. Accordingly, the plurality of division information can be transmitted to the image display device in parallel, and the transmission of the image information can be smoothly performed.

The image display device generates the processed image information subjected to the image processing by the information processing apparatus on the basis of the plurality of received division information and displays the image based on the processed image information. Accordingly, a high definition image subjected to the image processing by the information processing apparatus can be displayed, compared with a case where transmission is performed with reduced resolution or data is compressed and the compressed data is transmitted.

Therefore, according to the above-described configuration, even though a motion picture is displayed on the image display device, there is no case where a frame rate of a display image on the image display device is limited by a transmission speed of a single information transmission device, compared with a case where a single information transmission device is provided and the image information is sequentially transmitted to the image display device through the information transmission device. As a result, the display image on the image display device can be smoothly displayed according to the frame rate of the motion picture itself.

In the image display system according to the first aspect of the invention, the information transmission control unit may divide the processed image information of a plurality of frames for each frame so as to generate the plurality of division information.

According to this configuration, the information transmission control unit divides the processed image information of the plurality of frames for each frame so as to generate the plurality of division information. Accordingly, the division information (processed image information for each frame) can be allocated to the plurality of information transmitting units, and thus the plurality of division information can be transmitted to the image display device in parallel through the plurality of information transmission devices. Then, in the image display device, the image information generation unit reads out the division information stored in the plurality of storage regions of the information storage unit at a predetermined timing and arranges the division information in a predetermined sequence (generates the image information), such that an image for each frame can be displayed in a predetermined sequence.

That is, even though a motion picture is displayed on the image display device, since the processed image information of the plurality of frames according to the number of the in formation transmission devices is collectively transmitted to the image display device, and the division information is transmitted to the image display device in parallel through the plurality of information transmission devices, the frame rate of the display image on the image display device can be improved, for example, compared with the processed image information for each frame is sequentially transmitted to the image display device through a single information transmission device. Therefore, the display image on the image display device can be smoothly displayed according to the frame rate of the motion picture itself.

Further, the information transmission control unit divides the processed image information of the plurality of frames for each frame so as to generate the plurality of division information. Therefore, a processing structure for generating the plurality of division information can be implemented by a simple configuration, and a processing structure of the information transmission control unit can be simplified.

In the image display system according to the first aspect of the invention, the information transmission control unit may divide the processed image information for each predetermined region on a display region so as to generate the plurality of division information.

According to this configuration, the information transmission control unit divides the processed image information for each predetermined region on the display region so as to generate the plurality of division information. Accordingly, the division information can be allocated to the plurality of information transmitting units, and thus the division information can be transmitted to the image display device in parallel through the plurality of information transmission devices. Then, in the image display device, the image information generation unit arranges the division information stored in the plurality of storage regions of the information storage unit and generates the processed image information, such that the image based on the processed image information can be displayed.

In the image display system according to the first aspect of the invention, the information transmission control unit may divide the processed image information for each predetermined region on a display region on the basis of respective transmission speeds according to the standards of the plurality of information transmission devices so as to generate the plurality of division information.

When the plurality of division information obtained by dividing the processed image information for each predetermined region on the display region are transmitted to the image display device in parallel through the plurality of information transmission devices, it is preferable that the transfer times of the division information through the plurality of information transmission devices be the same. For example, when the transmission speed of one of the plurality of information transmission devices is higher than the transmission speeds of other information transmission devices, the transfer time of one division information to be transmitted through one information transmission device having a higher transmission speed among the plurality of information transmission devices is likely to be smaller than the transfer times of other division information transmitted through other information transmission devices. Then, in the image display device, a timing at which one division information is stored becomes different from a timing at which other division information is stored. Then, after other division information is stored, the division information is read out from the storage regions so as to generate the image information, and then the image is displayed on the display unit. Accordingly, as described above, when the transmission speeds according to the standards of the plurality of information transmission devices are different from one another, it is necessary to transmit the division information through the information transmission device having a high transmission speed in consideration of the transfer time of the division information through the information transmission device having a low transmission speed. That is, the use time of the information transmission device having a high speed becomes shorter (the stop state becomes long). Consequently, performance of the plurality of information transmission devices cannot be sufficiently utilized.

According to the above-described configuration, the information transmission control unit divides the processed image information for each predetermined region on the display region on the basis of the transmission speeds according to the standards of the plurality of information transmission devices so as to generate the plurality of division information. Accordingly, even though the transmission speeds according to the standards of the plurality of information transmission devices are different from one another, for example, the processed image information is divided for each region according to a ratio of the transmission speeds so as to generate the plurality of division information. Then, if the division information is allocated to the information transmitting units corresponding to the information transmission devices and transmitted to the image display device through the information transmission devices, the transfer times of the division information through the Information transmission devices can be the same. Therefore, even though the transmission speeds according to the standards of the plurality of information transmission devices are different from one another, the use times of the information transmission devices can be the same, without making the use time of the information transmission device having a high transmission speed shorter than the use time of the information transmission device having a low transmission speed. As a result, the performance of the plurality of information transmission devices can be sufficiently utilized.

In the image display system according to the first aspect of the invention, the information processing apparatus may include a processing apparatus-side display control unit that controls driving of a processing apparatus-side display unit and causes the processing apparatus-side display unit to display different images in the regions on the display region, and a display image acquisition unit that acquires display image information about the images displayed on the display region of the processing apparatus-side display unit. The image processing unit performs a predetermined image processing on the display image information acquired by the display image acquisition unit. The information transmission control unit divides processed display image information subjected to the image processing by the image processing unit for the regions, in which the processing apparatus-side display control-unit causes the processing apparatus-side display unit to display different images, so as to generate the plurality of division information.

When a so-called multi-window system that causes the processing apparatus-side display unit to display different images in the regions on the display region is used the information processing apparatus, in a specific region (window), there is a high possibility that an image frequently change. Meanwhile, in a region other than the specific region, for example, a background region where a background image as displayed, there is a low possibility that an image frequently changes.

According to the above-described configuration, the information processing apparatus includes the processing apparatus-side display control unit, and is configured as a multi-window system. Further, the information processing apparatus acquires the display image information about the image to be displayed on the display region of the processing apparatus-side display unit, then performs the predetermined image processing on the display image information, and subsequently the processed display image information to the image display device. Then, the image display device displays the image (the image displayed on the display region of the processing apparatus-side display unit) based on the processed display image information. Here, the information transmission control unit divides the processed display image information for the regions, in which the processing apparatus-side display control unit causes the processing apparatus-side display unit to display different images so as to generate the plurality of division information Accordingly, for example, as described below, the plurality of division information can be transmitted.

For example, the information transmission control unit allocates the division information corresponding to the specific region (window) to the information transmitting unit corresponding to the information transmission device having higher transmission speed than other information transmission devices among the plurality of information transmission devices. Further, the information transmission control unit allocates the division information corresponding to the background region to the information transmitting unit corresponding to the information transmission device having a low transmission speed. Then, the information transmission control unit transmits the division information to the image display device through the information transmission devices.

According to the above-described configuration, with respect to the image based on the division information corresponding to the background region having a low possibility that an image frequently changes, the image display device can update, at a short cycle, the image based on the division information corresponding to the specific region having a high possibility that an image frequently changes. Therefore, the performance of the plurality of information transmission devices can be appropriately used, such that the image display device can favorably display the image displayed on the display region of the processing apparatus-side display unit.

In the image display system according to the first aspect of the invention, the information transmission control unit may divide color data for each pixel to be represented by bits in the processed image information at a predetermined bit length so as to generate the plurality of division information.

When a PC is used as the information processing apparatus, a predetermined image processing, for example, a color correction processing can be performed on the image information through a graphic processing function of the PC, such that color data having 8-bit precision for each original pixel can be converted to color data having 10-bit precision or more for each pixel. That is, since the processed image information including such high-definition color data is transmitted to the image display device to be then displayed, a high-definition image can be displayed. However, since the number of bits of color data increases, the data amount of the processed image information to be transmitted to the image display device through the information transmission device becomes larger. Accordingly, smooth transmission is rarely performed.

According to the above-described configuration, the information transmission control unit divides color data for each pixel included in the processed image information at a predetermined bit length so as to generate the plurality of division information. Accordingly, the division information can be allocated to the plurality of information transmitting units, and thus the division information can be transmitted to the image display device in parallel through the plurality of information transmission devices. Then, in the image display device, the image information generation unit reads out the division information stored in the plurality of storage regions of the information storage unit and generates the processed image information, such that the image based on the processed image information can be displayed. That is, smooth transmission can be performed with a reduced data amount of information (division information) to be transmitted, and a high-definition image can be displayed by the image display device.

For example, the information transmission control unit divides color data into main partial precision data having length of several bits (for example, an 8-bit length) from the most significant bits that are important to determine co or information of each pixel, and at least one detailed partial precision data having a different bit length, thereby generating the plurality of division information. The main partial precision data required at the minimum is transmitted to the image display device through one of the plurality of information transmission devices, such that an image is displayed at the minimum precision by the image display device. Further, other information transmission devices are appropriately used, and thus at least one of detailed partial precision data is transmitted to the image display device through other information transmission devices. Then, a higher definition image is displayed by the image display device on the basis of the main partial precision data and at least one detailed partial precision data. According to this configuration, since a user appropriately selects the information transmission device to use, the precision of the image to be displayed by the image display device can be changed according to the use of the user. Therefore, convenience of the image display system can be improved.

In the image display system according to the first aspect of the invention, the information transmission control unit may allocate the plurality of division information to the plurality of information transmitting units to be then transmitted based on transmission speeds according to the standards of the plurality of information transmission devices.

According to this configuration, the information transmission control unit allocates the plurality of division information to the plurality of information transmitting units to be then transmitted on the basis of the transmission speeds according to the standards of the plurality of information transmission devices. Accordingly, for examples the division information having a large data amount can be transmitted to the image display device through the information transmission device having a higher transmission speed than the transmission speeds of other information transmission devices, and the division information having a small data amount can be transmitted to the image display device through the information transmission device having a low transmission speed. Therefore, even though the transmission speeds according to the standards of the plurality of information transmission devices are different from one another, the performance of the plurality of information transmission devices can be sufficiently utilized.

In the image display system according to the first aspect of the invention, a plurality of information processing apparatuses may be provided and connected to the image display device through the plurality of information transmission devices. The image information generation unit may allocate image information transmitted from the plurality of information processing apparatuses through the plurality of information transmission devices to predetermined regions and generates display image information. The display device-side display control unit may cause the display device-side display unit to display an image based on the display image information generated by the image information generation unit.

According to this configuration, the images based on the image information transmitted from the plurality of information processing apparatuses can be displayed in predetermined regions on the display region in the display device-side display unit. Therefore, the images can be displayed according various display modes, and thus convenience of the image display system can be improved.

According to a second aspect of the invention, there is provided an image display method that uses an image display system including an information processing apparatus that processes image information, an image display device that displays an image based on the image information processed by the information processing apparatus, and an information transmission device that connects the information processing apparatus and the image display device so as to enable information transmission and reception. The image display method causes the information processing apparatus to execute performing a predetermined image processing on the image information, dividing processed image information subjected to the image processing and generating a plurality of division information, and allocating the plurality of division information to the plurality of information transmission devices so as to transmit the plurality of division information to the image display device. The image display method causes the image display device to execute receiving the plurality of division information through the plurality of information transmission devices, storing the plurality of received division information in storage regions corresponding to the information transmission devices among a plurality of storage regions, reading out the plurality of division information stored in the plurality of storage regions and generating the processed image information, and displaying an image based on the generated processed image information.

The above-described image display method according to the second aspect of the invention is performed by the above-described image display system. Therefore, the same advantages and effects as the above-described image display system can be obtained.

According to a third aspect of the invention, there is provided an information processing apparatus that performs a processing on image information and transmits processed image information subjected to the processing to an image display device through a plurality of information transmission devices. The information processing apparatus includes a plurality of information transmitting units that are provided to correspond to the plurality of information transmission devices and transmit information to the image display device through the plurality of information transmission devices, an image processing unit that performs a predetermined image processing on the image information, and an information transmission control unit that divides the processed image information subjected to the image processing by the image processing unit so as to generate a plurality of division information, and allocates the plurality of division information to the plurality of information transmitting units to be then transmitted.

The above-described information processing apparatus according to the third aspect of the invention is suitable for the above-described image display system.

According to a fourth aspect of the invention, there is provided a control, program for an information processing apparatus that performs a processing on image information and transmits processed image information subjected to the processing to an image display device through a plurality of information transmission devices. The control program causes a computer incorporated into the information processing apparatus to execute performing a predetermined image processing on the image information, dividing the processed image information subjected to the image processing and generating a plurality of division information, and allocating the plurality of division information to the plurality of information transmission devices so as to transmit the plurality of division information to the image display device.

According to a fifth aspect of the invention, there is provided a computer-readable recording medium having recorded thereon the above-described control program.

The control program and the recording medium having the above-described configuration are used to perform the above-described image display method. Therefore, the same advantages and effects as the above-described image display method can be obtained.

According to a sixth aspect of the invention, there is provided an image display device that is connected to an information processing apparatus, which performs a processing on image information, divides processed image information subjected to the processing into a plurality of division information, and transmits the plurality of division information through a plurality of information transmission devices, through the plurality of information transmission devices. The image display device includes a plurality of information receiving units that are provided to correspond to the plurality of information transmission devices, and receive the plurality of division information transmitted from the information processing apparatus through the plurality of information transmission devices, an information storage unit that has a plurality of storage regions corresponding to the plurality of information receiving units, and stores the plurality of division information received by the plurality of information receiving units in the storage regions corresponding to the information receiving units, an image information generation unit that reads out the plurality of division information stored in the plurality of storage regions of the information storage unit, and generates the processed image information, and a display device-side display control unit that causes a display device-side display unit to display an image based on the processed image information generated by the image information generation unit.

The above-described image display device according to the sixth aspect of the invention is suitable for the above-described image display system.

According to a seventh aspect of the invention, there is provided a control program for an image display device that is connected to an information processing apparatus, which performs a processing on image information, divides processed image information subjected to the processing into a plurality of division information, and transmits the plurality of division information through a plurality of information transmission devices, through the plurality of information transmission devices. The control program causes a computer incorporated into the image display device to execute receiving the plurality of division information through the plurality of information transmission devices, storing the plurality of received division information in storage regions corresponding to the information transmission devices among a plurality of storage regions, reading out the plurality of division information stored in the plurality of storage regions and generating the processed image information, and displaying an image based on the generated processed image information.

According to an eighth aspect of the invention, there is provided a computer-readable recording medium having recorded thereon the above-described control program.

The control program and the recording medium having the above-described configuration are used to perform the above-described image display method. Therefore, the same advantages and effects as the above-described image display method can be obtained.

BRIEF DESCRIPTION OF THE DRAWINGS

The invention will be described with reference to the accompanying drawings, wherein like numbers reference like elements.

FIG. 8 is a diagram showing an example of a data structure of division data generated by the information spatial-division unit according to the second embodiment of the invention.

DESCRIPTION OF EXEMPLARY EMBODIMENTS

First Embodiment

Hereinafter, an embodiment of the invention will be described with reference to the drawings.
Configuration of Projection System FIG. 1 is an exterior view of a projection system as an image display system.

Figure 1:
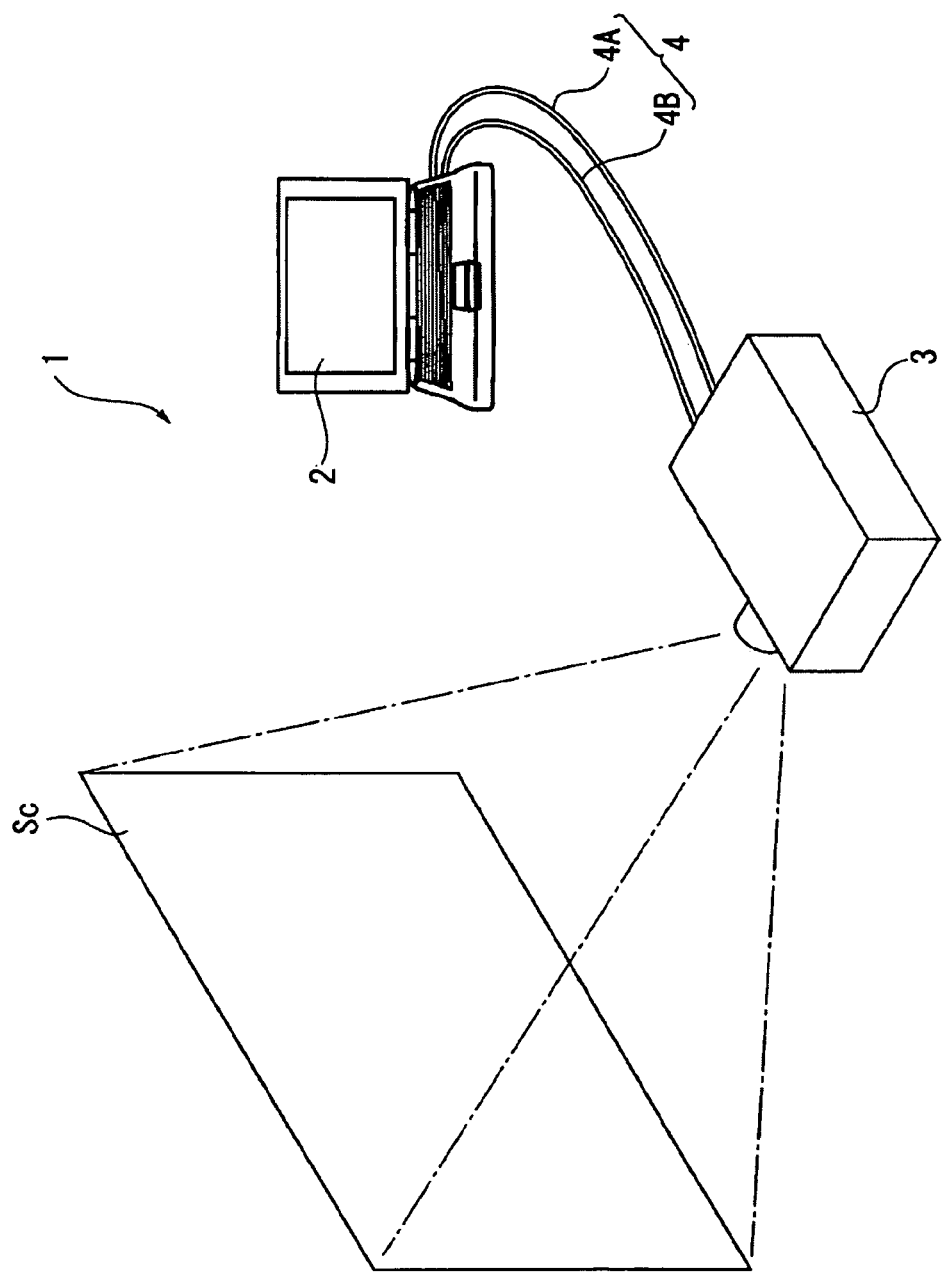
FIG. 1 is an exterior view of a projection system as an image display system according to a first embodiment of the invention.

As shown in FIG. 1, the projection system 1 includes a PC 2 serving as an information processing apparatus that performs a predetermined image processing on an image of a video source and output an image data signal, a projector 3 that generates a current image frame on the basis of the image data signal from the PC 2 and projects the generated image frame toward a screen Sc, and an information transmission device 4 that connects the PC 2 and the projector 3 so as to enable data transmission and reception.
Configuration of Information Transmission Device The information transmission device 4 has a signal transmission path through which a digital signal can be transmitted. That is, as the information transmission device 4, any configuration can be used insofar as it can transmit the digital signal. For example, the standard for transmitting the digital signal in a wired manner, for example, through a USB cable, a LAN (Local Area Network) cable, or the like, or the standard for transmitting the digital signal through a wireless medium (electric wave, sound, or infrared ray) may be exemplified. In this embodiment, as shown in FIG. 1, as the information transmission device 4, two information transmission devices 4A and 4B, such as a USB cable or a LAN cable, transmitting the digital signal in a wired manner are provided. Moreover, the number of the plurality of information transmission devices 4 is not limited to two. Further, the standards of a plurality of information transmission devices 4 are not particularly limited. For example, the standards may be identical or different.
Configuration of PC FIG. 2 is a block diagram showing the schematic configuration of the PC 2.

Figure 2:
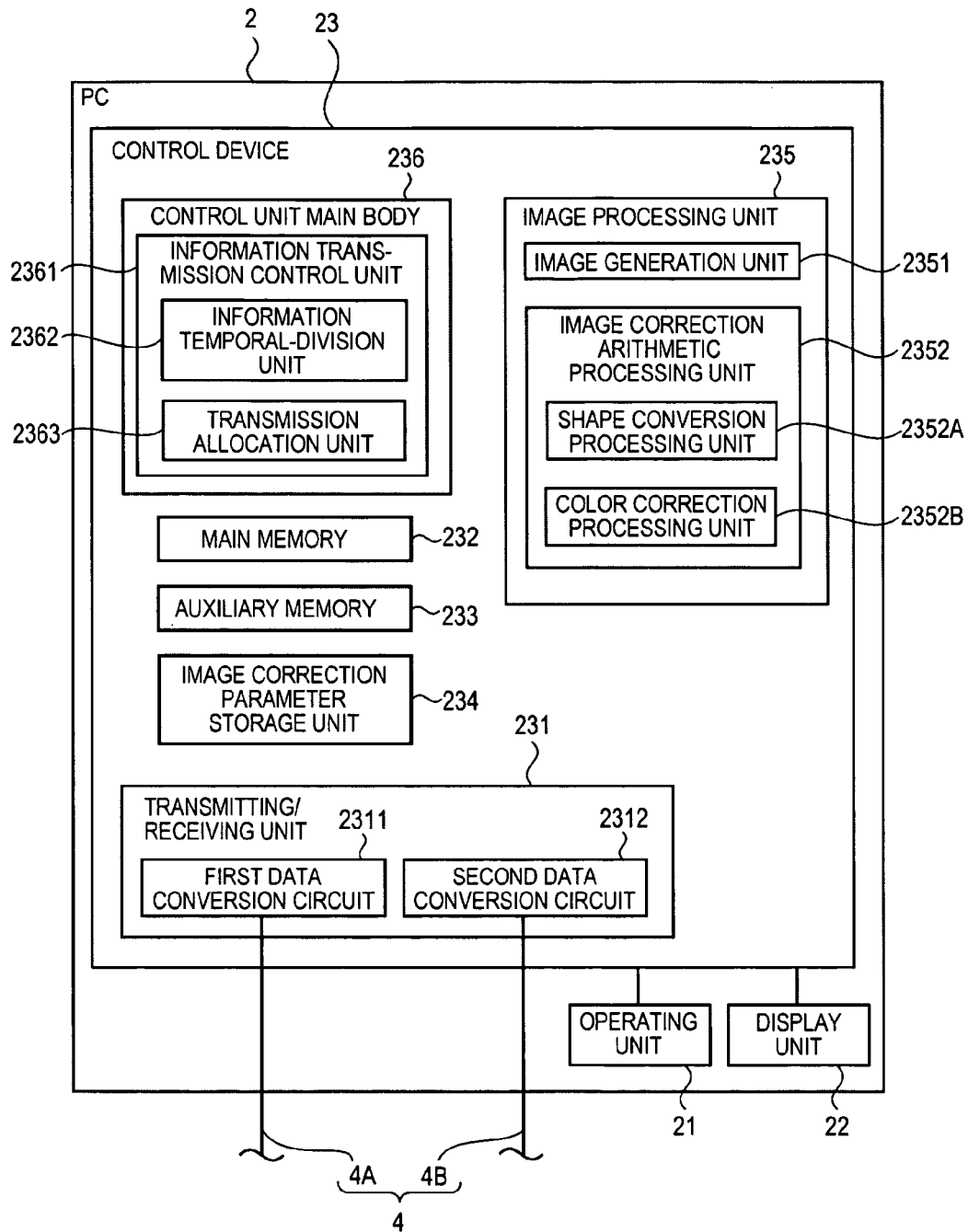
FIG. 2 is a block diagram showing the schematic configuration of a PC according to the first embodiment of the invention.

As shown in FIG. 2 the PC 2 primarily includes an operating unit 21, a display unit 22, and a control device 23.

The operating unit 21 has various operating buttons that are operable by a keyboard or a mouse. With the input operation of the operating buttons, the control device 23 appropriately operates, and the operation contents of the control device 23 are set on information to be displayed on the display unit 22. Then, with the input operation of the operating unit 21 by the user, a predetermined operation signal is output from the operating unit 21 to the control device 23.

Moreover, as for the operating unit 21, various conditions may be set with, for example, an input operation by a touch panel, or an input operation by sound, in addition to the input operation of the operating buttons.

The display unit 22 is controlled by the control device 23 to display predetermined information. For example, the display unit 22 displays information processed by the control device 23 or, when information to be stored in a memory described below of the control device 23 is set or updated with the input operation of the operating unit 21, display data in the memory to be output from the control device 23. For example, examples of the display unit 29 include liquid crystal or organic EL (Electroluminescence), PDP (Plasma Display Panel), CRT (Cathode-Ray Tube), and the like.

The control device 23 executes a predetermined program according to the input of the operation signal from the operating unit 21 so as to control the entire PC 2. As shown in FIG. 2, the control device 23 includes a transmitting/receiving unit 231, a main memory 232, an auxiliary memory 233, an image correction parameter storage unit 234, an image processing unit 235, and a control unit main body 236. These components 231 to 236 are connected to one another by a bus (not shown) so as to enable transmission of required information.

The transmitting/receiving unit 231 executes data transmission/reception on the basis of the standards (for example, the USB standard if the information transmission device 4 is the USB cable) corresponding to various information transmission devices 4. That is, as shown in FIG. 2, the transmitting/receiving unit 231 includes a plurality (in this embodiment, two since the number of the information transmission devices 4 is two) of data conversion circuits 2311 and 2312 that correspond to various information transmission devices 4 and serve as information transmitting units for performing data transmission and reception on the basis of the standards corresponding to the information transmission devices 4.

Moreover, in this embodiment, as shown in FIG. 2, the data conversion circuit that performs data transmission and reception through the information transmission device 4A is referred to as a first data conversion circuit 2311. Further, the data conversion circuit that performs data transmission and reception through the information transmission device 4B is referred to as a second data conversion circuit 2312.

The main memory 232 stores various kinds of data. Various kinds of data include, for example, the operation signal output from the operating unit 21, data input through the transmitting/receiving unit 231, and data to be processed by the image processing unit 235 and the control unit main body 236.

As the auxiliary memory 233, a medium of a video source is used. For example, DVD (Digital Versatile Disc) having recorded thereon video and sound as digital data can be exemplified.

The image correction parameter storage unit 234 stores correction parameters for image correction according to characteristics of the projector 3.

The correction parameters to be stored in the image correction parameter storage unit 234 include, for example, various correction parameters for trapezoid correction, and luminance irregularity, color irregularity, and γ correction.

Moreover, a memory card or a CD-ROM having recorded hereon the correction parameters may be inserted into the PC 2 and then the correction parameters may be installed in the image correction parameter storage unit 234. Further, the PC 2 may read a predetermined correction parameter from the projector 3 through the information transmission device 4 and store the read correction parameter in the image correction parameter storage unit 234.

The image processing unit 235 includes, for example, a GPU (Graphics Processor Unit) or the like. The image processing unit 235 performs an image processing on image data using the above-described correction parameters. As shown in FIG. 2, the image processing unit 235 includes an image generation unit 2351, and an image correction arithmetic processing unit 2352.

The image generation unit 2351 performs decompression on the video source from the auxiliary memory 233 according to a recording method so as to decode image data for each frame. For example, with decoding, image data (image information) having 8-bit color information (color data) for each pixel is obtained. Then, the image generation unit 2351 outputs the decoded image data to the image correction arithmetic processing unit 2352.

As shown in FIG. 2, the image correction arithmetic processing unit 2352 includes a shape conversion processing unit 2352A and a color correction processing unit 2353B.

The shape conversion processing unit 2352A performs a shape correction processing, that is, trapezoid correction, correction to be performed according to the shape of the screen Sc when the screen Sc is curved, and correction of distortion due to a lens incorporated into the projector 3, on the image data decoded by the image generation unit 2351. Then, the shape conversion processing unit 2352A outputs image data subjected to the shape conversion processing to the color correction processing unit 2353B.

As for the image data output from the shape conversion processing unit 2352A, the color correction processing unit 2353B performs conversion correction (color correction processing) on color data of the image data according to color characteristics of the projector 3. Examples of the color correction processing include color conversion, γ correction, VT-γ correction, color irregularity correction, and the like. For example, with the color correction processing, the color data that is initially 8-bit data is corrected to have precision of 10 bits or more. Then, the color correction processing unit 2353B stores the processed image data subjected to the above-described image processing (shape conversion processing and color correction processing) in the main memory 232, for example. Moreover, the processed image data to be stored may be of several latest frames. The old frames are sequentially erased.

The control unit main body 236 includes, for example, a CPU (Central Processing Unit) and the like. The control unit main body 236 controls the entire PC 2 according to a predetermined program stored in the main memory 232 or the like. Moreover, in the following description, a processing function when the image data is transmitted to the projector 3 through the information transmission device 4 among functions of the control unit main body 236 will be primarily described, and the descriptions of other functions will be omitted. As shown in FIG. 2, the control unit main body 236 includes an information transmission control unit 2361 and the like.

The information transmission control unit 2361 controls driving of the transmitting/receiving unit 231 and causes the image data to be transmitted to the projector through the information transmission device 4. As shown in FIG. 2, the information transmission control unit 2361 includes an information temporal division unit 2362 and a transmission allocation unit 2363.

The information temporal division unit 2362 divides the processed image data for several frames stored in the main memory 232 in a temporal direction, that is, for each frame, on the basis of information about the number of the information transmission devices 4 to be used and information about the transmission speeds according to the standards of the information transmission devices 4 stored in the main memory 232 or the like in advance, thereby generating a plurality of division data (processed image data for each frame).

The transmission allocation unit 2363 allocates the division data generated by the information temporal division unit 2362 to the data conversion circuits 2311 and 2312 of the transmitting/receiving unit 231 on the basis of the information about the number of the information transmission devices 4 to be used and the information about the transmission speeds according to the standards of the information transmission devices 4 stored in the main memory 232 or the like in advance and causes the division data to be transmitted to the projector 3 through the information transmission devices 4 at a predetermined timing.

Moreover, the information about the number of the information transmission devices 4 to be used is not limited to a case where it is stored in the main memory 232 or the like in advance. For example, the information may be set and input by the operation oft the operating unit 21. Alternatively, when the information is transmitted to the projector 3 in a wired manner, for example, through a USB cable or a LAN cable, the number of cables to be connected may be detected and recognized by the control unit main body 236.

Configuration of Projector

Figure 3:
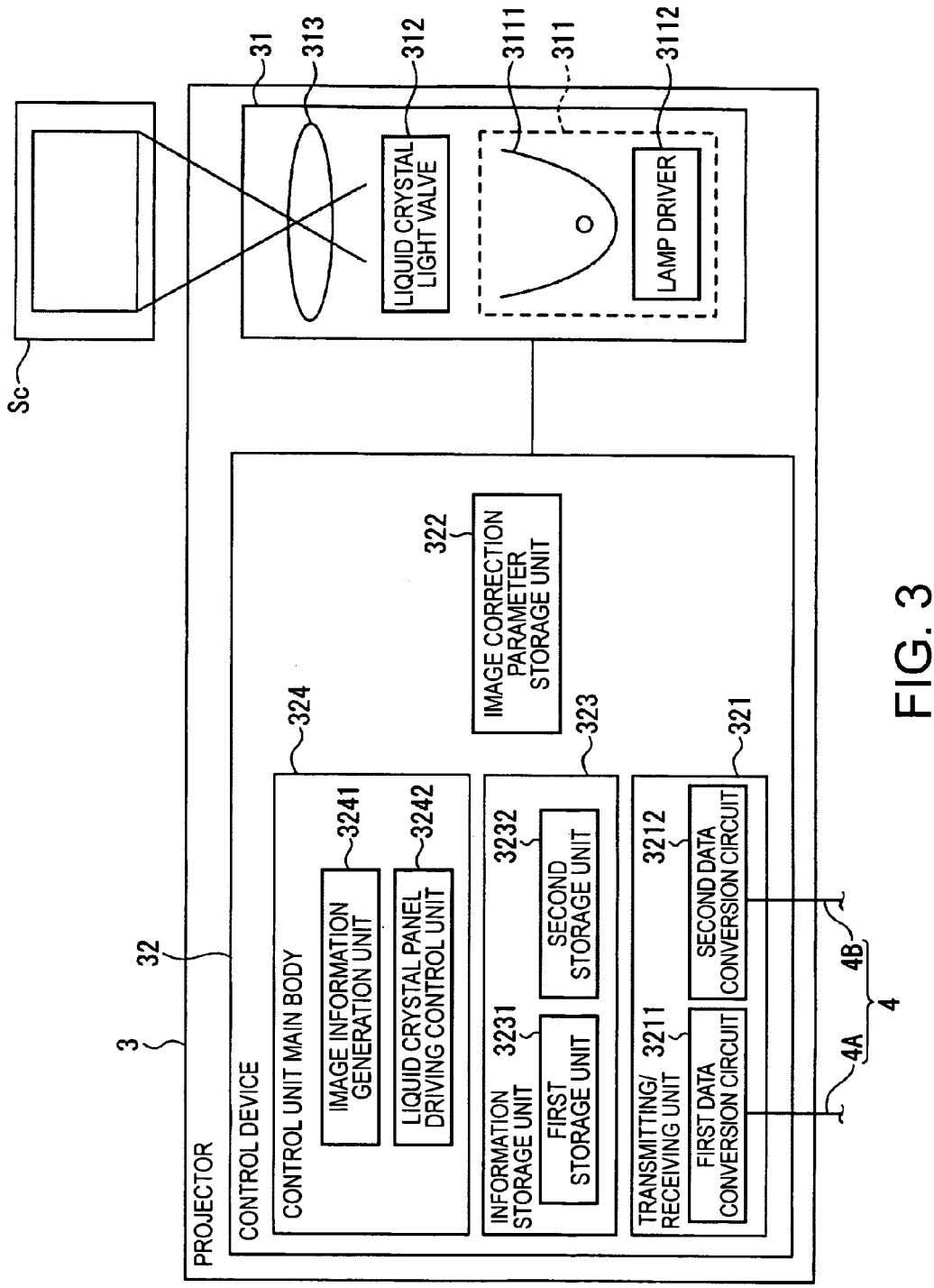
FIG. 3 is a block diagram showing the schematic configuration of a projector according to the first embodiment of the invention.

FIG. 3 is a block diagram showing the schematic configuration of the projector 3.

As shown in FIG. 3, the projector 3 primarily includes an image projection unit 31 as a display unit, and a control device 32.

The image projection unit 31 forms an optical system and projects an image onto the screen Sc on magnified scale under the control of the control device 32. As shown in FIG. 3, the image projection unit 31 includes a light source device 311, a liquid crystal light valve 312 as an optical modulation element, a projection optical device 313, and the like.

The light source device 311 emits a light flux toward the liquid crystal light valve 312 under the control of the control device 32. The light source device 311 includes a light source lamp 3111 and a lamp driver 3112.

The light source lamp 3111 is an extra high pressure mercury lamp. Moreover, the light source lamp 3111 is not limited to the extra high pressure mercury lamp. For example, other discharge and emission type light source lamps, such as a metal halide lamp and a xenon lamp, may be used. In addition, the light source lamp 3111 is not limited to the discharge and emission type light source lamp. For example, various self-luminous elements, such as a light-emitting diode, a laser diode, an organic EL element, and a silicon light-emitting element may be used.

The lamp driver 3112 drives the light source lamp 3111 with a predetermined driving voltage under the control of the control device 32.

The liquid crystal light valve 312 is a transmissive light crystal panel. The liquid crystal light valve 312 changes the alignment of liquid crystal molecules filled in liquid crystal cells (not shown) on the basis of a driving signal from the control device 32, and transmits or blocks a night flux emitted from the light lamp 3111 so as to emit an optical image according to the image data processed by the PC 2 to the projection optical device 313.

The projection optical device 313 projects the optical image emitted from the liquid crystal light valve 312 toward the screen Sc on magnified scale.

Moreover, though not shown, the projector 3 includes three liquid crystal light valves 312 corresponding three colors of R, G, and B. Further, the light source device 311 includes a color light separation optical system that separate light from the light source into three color light components. In addition, the projection optical device 313 has a synthesis optical system that synthesizes the three color light components so as to generate an optical image representing a color image. Moreover, as the configurations of the optical systems, the configurations of the optical systems of a general projector can be used.

The control device 32 controls the entire projector 3 according to control commands from the PC 2. As shown in FIG. 3, the control device 32 includes a transmitting/receiving unit 321, an image correction parameter storage unit 322, an information storage unit 323, and a control unit main body 324. These components 321 and 324 are connected to one another by a bus (not shown) so as to enable transmission and reception of required information.

The transmitting/receiving unit 321 is the same as the transmitting/receiving unit 231 of the PC 2. The transmitting/receiving unit 321 executes data transmission/reception on the basis of the standards (for example, the USB standard if the information transmission device 4 is the USB cable) corresponding to various information transmission devices 4. That is, like the transmitting/receiving unit 231 of the PC 2, as shown in FIG. 3, the transmitting/receiving unit 321 includes a plurality (in this embodiment, two since the number of the information transmission devices 4 is two) of data conversion circuits 3211 and 3212 that correspond to various information transmission devices 4 and serve as information receiving units for performing data transmission and reception on the basis of the standards corresponding to the information transmission devices 4.

Moreover, in this embodiment, as shown in FIG. 3, the data conversion circuit that performs data transmission and reception through the information transmission device 4A is referred to as a first data conversion circuit 3211. Further, the data conversion circuit that performs data transmission and reception through the information transmission device 4B is referred to as a second data conversion circuit 3212.

The image correction parameter storage unit 322 stores correction parameters for image correction according to characteristics of the projector 3. The correction parameters include, for example, various correction parameters for trapezoid correction, and luminance irregularity, color irregularity, and γ correction.

The information storage unit 323 has a plurality (in this embodiment, two since the number of the data conversion circuits is two) of storage units 3231 and 3232 corresponding to the data conversion circuits 3211 and 3212 constituting the transmitting/receiving unit 321. The information storage unit 323 sequentially stores the division data from the PC 2 received by the transmitting/receiving unit 321 (data conversion circuit) in the storage units 3231 and 3232 corresponding to the data conversion circuits 3211 and 3212.

Moreover, in this embodiment, as shown in FIG. 3, the storage unit that stores data received by the first data conversion circuit 3211 is referred to as a first storage unit 3231.

Further, the storage unit that stores data received by the second data conversion circuit 3212 is referred to as a second storage unit 3232.

As the storage units 3231 and 3232, for example, VRAM (Video Random Access Memory) or the like can be used.

Moreover, the information storage unit 323 may be a single storage unit that has a plurality of storage regions corresponding to the data conversion circuits constituting the transmitting/receiving unit 321, instead of having the plurality of storage units 3231 and 3232.

The control unit main body 324 includes, for example, a CPU and the like. The control unit main body 324 controls the entire projector 3 according to the control commands from the PC 2 or a program stored in a memory (not shown). As shown in FIG. 3, the control unit main body 324 includes an image information generation unit 3241, a liquid crystal panel driving control unit 3242 serving as a display control unit, and the like.

The image information generation unit 3241 alternately reads out the division data (processed image data for each frame) to be sequentially stored in the storage units 3231 and 3232 at a predetermined timing, and outputs the read division data to the liquid crystal panel driving control unit 3242. That is, the image information generation unit 3241 alternately reads out the division data to be sequentially stored in the storage units 3231 and 3232 at a predetermined timing, arranges the division data in a predetermined sequence, and outputs the arranged division data.

The liquid crystal panel driving control unit 3242 outputs a driving signal based on the division data output from the image information generation unit 3241 to the liquid crystal light valve 312 and causes the liquid crystal light valve 312 to form an optical image based on the processed image data.

Operation of Projection System

Next, the operation of the above-described projection system 1 will be described with reference to the drawings.

Figure 4:
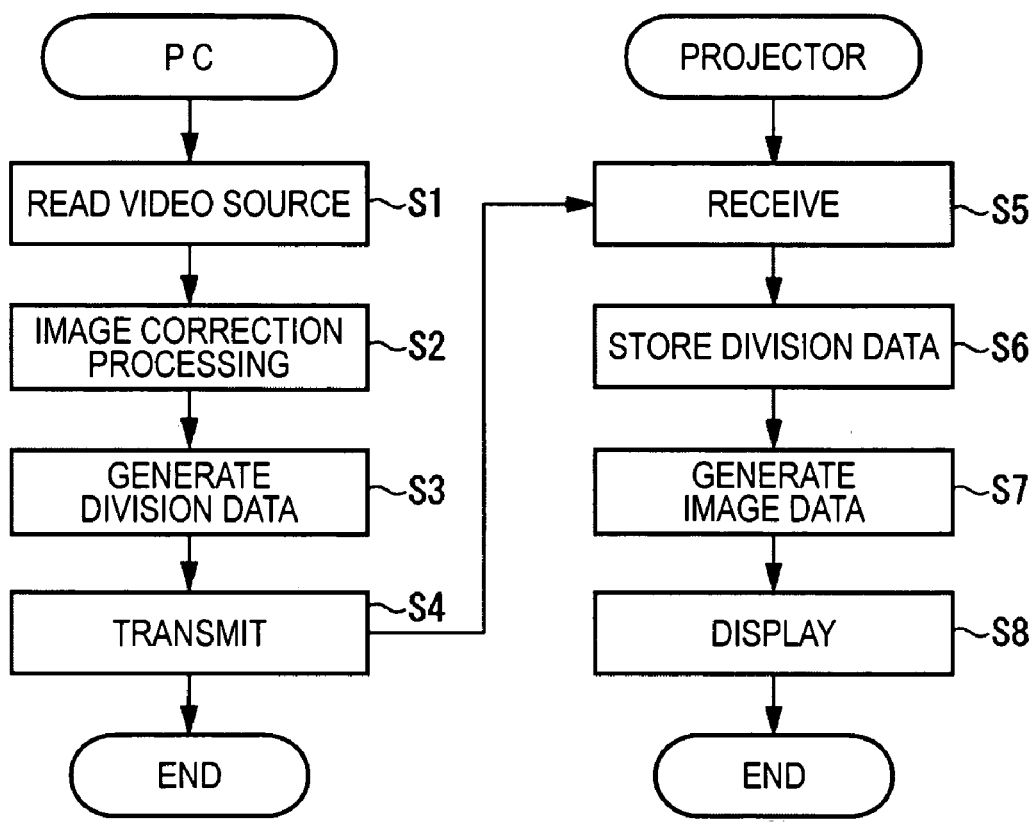
FIG. 4 is a flowchart illustrating the operation of the projection system according to the first embodiment of the invention.

FIG. 4 is a flowchart illustrating the operation of the projection system 1. Specifically, FIG. 4 is a flowchart illustrating the operation until the projector 3 projects (displays) the video source (for example, a motion picture).

Hereinafter, it is assumed that the PC 2 and the projector 3 are connected to each other through the two information transmission devices 4A and 4B.

First, the control unit main body 236 of the PC 2 outputs a predetermined control command to the image processing unit 235 according to a predetermined program through the operation of the operating unit 21 by the user, for example.

The image processing unit 235 reads the video source from the auxiliary memory 233 according to the control command from the control unit main body 236 and performs decoding or IP conversion on the video source so as to generate mage data (Step S1).

After Step S1, the image processing unit 235 performs the shape conversion processing or the color conversion processing on the generated image data (Step S2: Image Processing Step). Then, the image processing unit 235 sequentially stores processed image data subjected to the shape conversion processing and the color correction processing, for example, in the main memory 232 or the like.

After Step S2, the control unit main body 236 sequentially divides the processed image data of several frames stored in the main memory 232 so as to generate a plurality of division data (Step S3: Information Division Step).

After Step S3, the control unit main body 236 allocates the plurality of generated division data to the data conversion circuits 2311 and 2312 of the transmitting/receiving unit 231 on the basis of the information about the number of the information transmission devices 4 (in this embodiment, two) to be used stored in the main memory 232 or the like and the information about the transmission speeds according to the standards of the information transmission devices 4 to be then sequential transmitted to the projector 3 through the information transmission devices 4 at a predetermined timing (Step S4: Transmission Step).

After Step S4, the projector 3 sequentially receives the division data by the data conversion circuits 3211 ad 3212 of the transmitting/receiving unit 321 corresponding to the information transmission devices 4, converts the division data into data to be read by the control unit main body 324, and outputs the converted data (Step S5: Reception Step).

After Step S5, the storage units 3231 and 3232 of the information storage unit 323 corresponding to the data conversion circuits 3211 and 3212 sequentially store the received division data (Step S6: Information Storage Step).

After Step S6, the image information generation unit 3241 alternately reads out the division data (processed image data for each frame) to be sequentially stored in the storage units 3231 and 3232 at a predetermined timing, then arranges the division data, for example, according to a play sequence of a motion picture, and sequentially outputs the arranged division data to the liquid crystal panel driving control unit 3242 (Step S7: Image Generation Step).

After Step S7, the liquid crystal panel driving control unit 3242 sequentially outputs driving signals based on the division data to be sequentially output from the image information generation unit 3241 to the liquid crystal light valve 312. Then, the optical images based on the processed image data are sequentially formed on the liquid crystal light valve 312 (Step S8: Image Display Step).

Through Steps S1 to S8, for example, the motion picture is displayed on the screen Sc.

According to the first embodiment of the invention, the following effects are obtained.

Figure 5A:
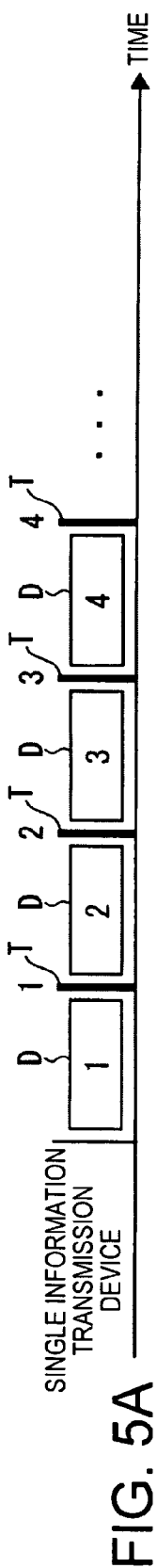
FIGS. 5A to 5C are diagrams illustrating an effect of the first embodiment of the invention.
Figure 5B:
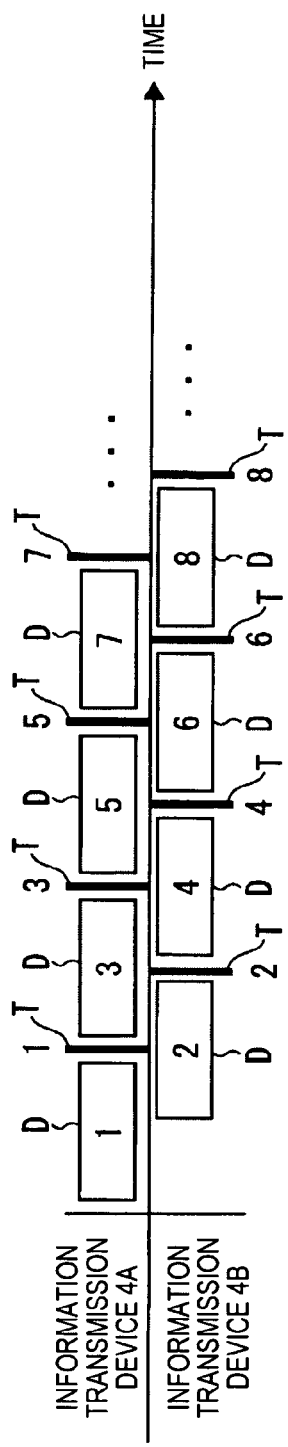
Figure 5C:
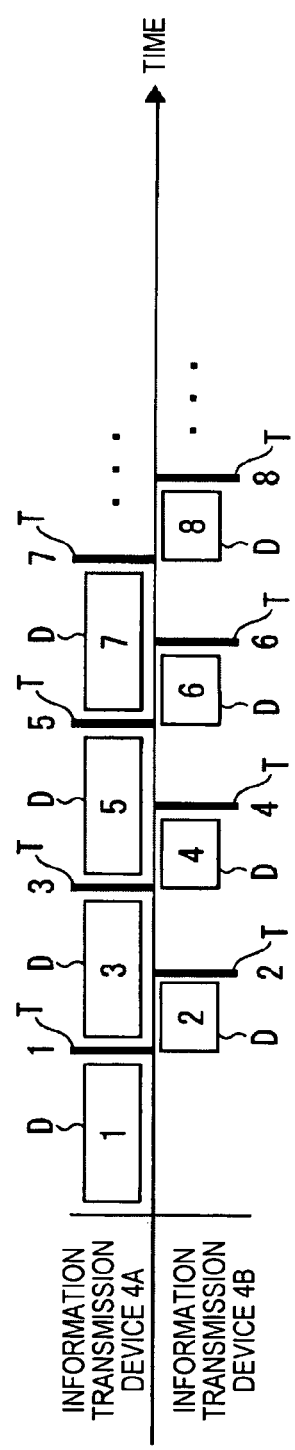

FIGS. 5A to 5C are diagrams illustrating the effects of the first embodiment of the invention. Specifically, FIGS. 5A to 5C show the transfer time of the processed image data D for each frame and the frame rate of the display image (projection image) on the projector with a time as the horizontal axis.

When a single information transmission device is provided, and the processed image data for each frame is sequentially transmitted to the projector through the single information transmission device, the frame rate of the display image on the projector is as shown in FIG. 5A. Specifically, as shown in FIG. 5A, whenever the transmission of the processed image data D for each frame from the PC to the projector is completed, the projector stores the processed image data D for each frame in an internal storage unit. Then, the projector appropriately reads out the processed image data D for each frame stored in the storage unit, forms the optical image based on the processed image data D for each frame on the liquid crystal light valve, thereby displaying the image. Here, a time required for writing the processed image data D in the storage unit and driving the liquid crystal light valve is sufficiently small compared with the transfer time of the processed image data D. Accordingly, as shown in FIG. 5A, the projector displays the image at a timing T after the transmission of the processed image data D for each frame is completed. That is, according to the above-described configuration, the frame rate (display timing T) of the display image on the projector is limited to the transmission speed of the single information transmission device. In particular, when a motion picture is displayed on the projector, it is impossible to perform display according to the frame rate of the motion picture itself, which causes inconvenience of an observer.

In this embodiment, as the information transmission device 4, the two information transmission devices 4A and 4B are provided. Further, the information transmission control unit 2361 of the PC 2 divides the processed image data of the plurality of frames for each frame so as to generate the plurality of division data (processed image data for each frame). In addition, the information transmission control unit 2361 allocates the division data to the data conversion circuits 2311 and 2312 of the transmitting/receiving unit 231, and thus the division data are transmitted to the projector 3 in parallel through the information transmission devices 4A and 4B.

For example, when the transmission speeds according to the standards of the information transmission devices 4A and 4B are same, as shown in FIG. 5B, the information transmission control unit 2361 alternatively transmits the processed image data D for each frame to the data conversion circuits 2311 and 2312 at the predetermined timing. Then, as shown in FIG. 5B, the projector 3 alternately reads out the processed image data D to be transmitted through the information transmission devices 4A and 4B and sequentially stored in the storage units 3231 and 3232, respectively, arranges the read division data in a predetermined sequence. The liquid crystal panel driving control unit 3242 causes the liquid crystal light valve 312 to form the optical image based on the processed image data D for each frame, thereby displaying the image. In such a manner, even though the motion picture is displayed on the projector 3, the frame rate (display timing T) of the display image on the projector 3 is not limited to the transmission speed of the single information transmission device. Accordingly, it is possible to realize a higher frame rate than the frame rate of the display image on the projector 3 shown in FIG. 5A. Therefore, it is possible to perform smooth display according to the frame rate of the motion picture itself.

Further, for example, when the transmission speeds according to the standards of the information transmission devices 4A and 4B are different from each other, that is, when the transmission speed of the information transmission device 4A is lower than the transmission speed of the information transmission device 4B, the frame rate (display timing T) of the display image on the projector 3 is as shown in FIG. 5C. Specifically, as shown in FIG. 5C, the information transmission control unit 2361 transmits the next processed image data D immediately after the processed image data D is transmitted to the data conversion circuit 2311 corresponding to the information transmission device 4A. Further, the information transmission control unit 2361 transmits the next processed image data D at a predetermined interval after the processed image data D is transmitted to the data conversion circuit 2312 corresponding to the information transmission device 4B. That is, the use time of the information transmission device 4B having a high transmission speed becomes shorter (the stop state becomes longer) but the performance of the information transmission device 4B having a high transmission speed cannot be sufficiently utilized. In this case, however, like the example shown in FIG. 5B, it is possible to realize a higher frame rate than the frame rate of the display image on the projector 3 shown in FIG. 5A.

Further, the projector 3 generates the processed image data subjected to the image processing by the PC 2 on the basis of the plurality of received division data and displays the image based on the processed image data. Accordingly, a high-definition image subjected to the image processing by the PC 2 can be displayed, compared with a case where data is transmitted with reduced resolution or data is compressed and the compressed data is transmitted.

In addition, the information transmission control unit 2361 divides the processed image data of the plurality of frames for each frame so as to generate the plurality of division data. Accordingly, the generation of the plurality of division data can be implemented by a simple structure.

Second Embodiment

Next, a second embodiment of the invention will be described with reference to the drawings.

In the following description, the same parts as those described above are represented by the same reference numerals, and the descriptions thereof will be omitted.

Figure 6:
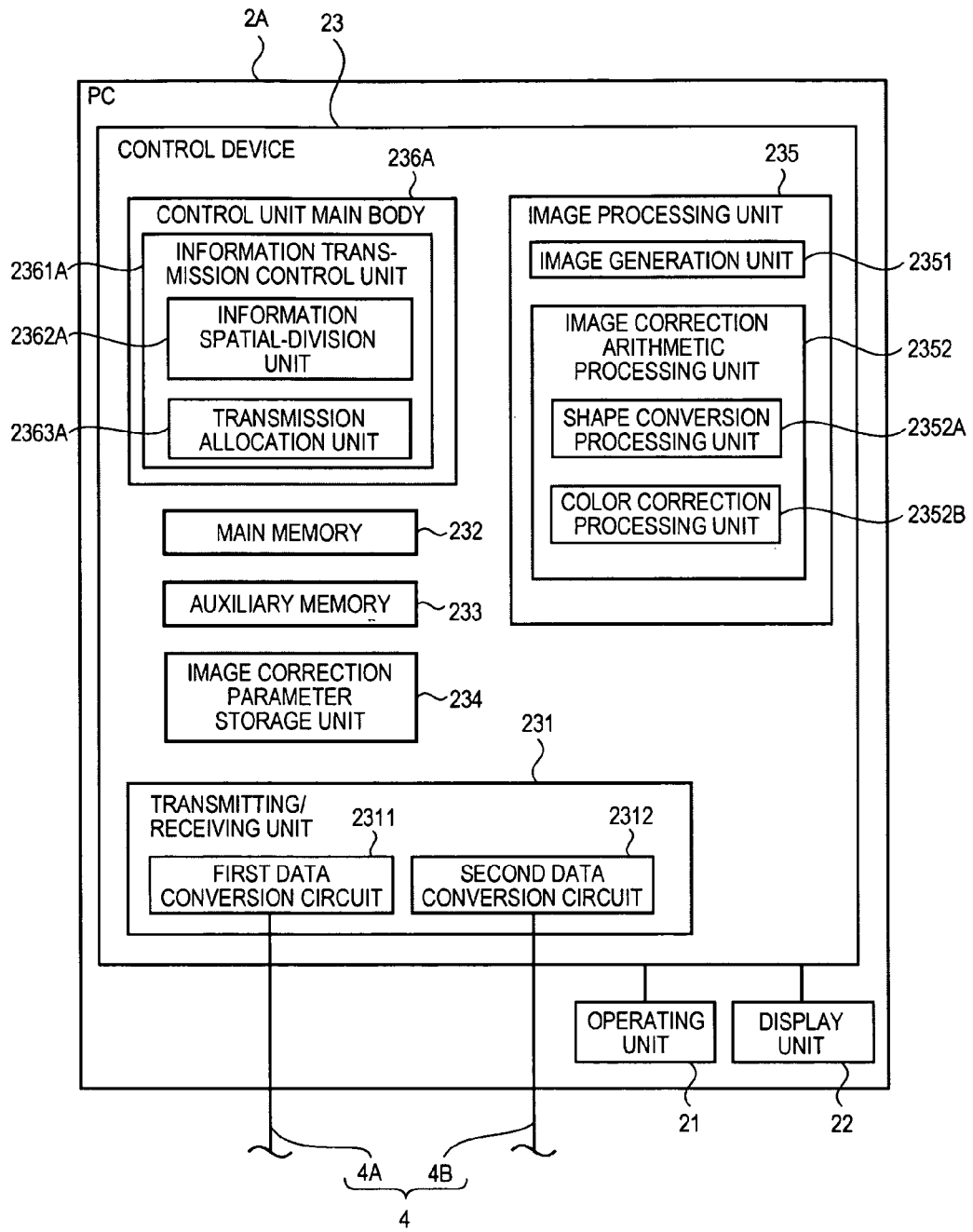
FIG. 6 is a block diagram showing the schematic configuration of a PC according to a second embodiment of the invention.

FIG. 6 is a block diagram showing the schematic configuration of a PC 2A according to the second embodiment of the invention.

In the first embodiment, the information transmission control unit 2361 of the control unit main body 236 constituting the PC 2 divides the processed image data of several frames in the temporal direction, that is, for each frame so as to generate the plurality of division data (processed image data for each frame).

In contrast, in the second embodiment, an information transmission control unit 2361A of a control unit main body 236A constituting the PC 2A spatially divides the processed image data of one frame so as to generates a plurality of division data. That is, in this embodiment, a processing structure of the information transmission control unit 2361A of the PC 2A is different from the first embodiment, and other parts are the same as those in the first embodiment.

As shown in FIG. 6, the information transmission control unit 2361A includes an information spatial division unit 2362A and a transmission allocation unit 2363A.

The information spatial division unit 2362A divides the processed image data (image information) of one frame stored in the main memory 232 on the basis of information about the number of the information transmission devices 4 to be used and information about the transmission speeds according to the information transmission devices 4 stored in the main memory 232 or the like in advance so as to generate the plurality of division data.

Moreover, the information about the number of the information transmission devices 4 to be used is not limited to a case where it is stored in the main memory 232 or the like in advance. For example, the information may be set and input by the operation of the operating unit 21. Alternatively, when the information is transmitted to the projector 3 in a wired manner, for example, through a USB cable or a LAN cable, the number of cables to be connected may be detected and recognized by a control unit main body 236B.

Figure 7:
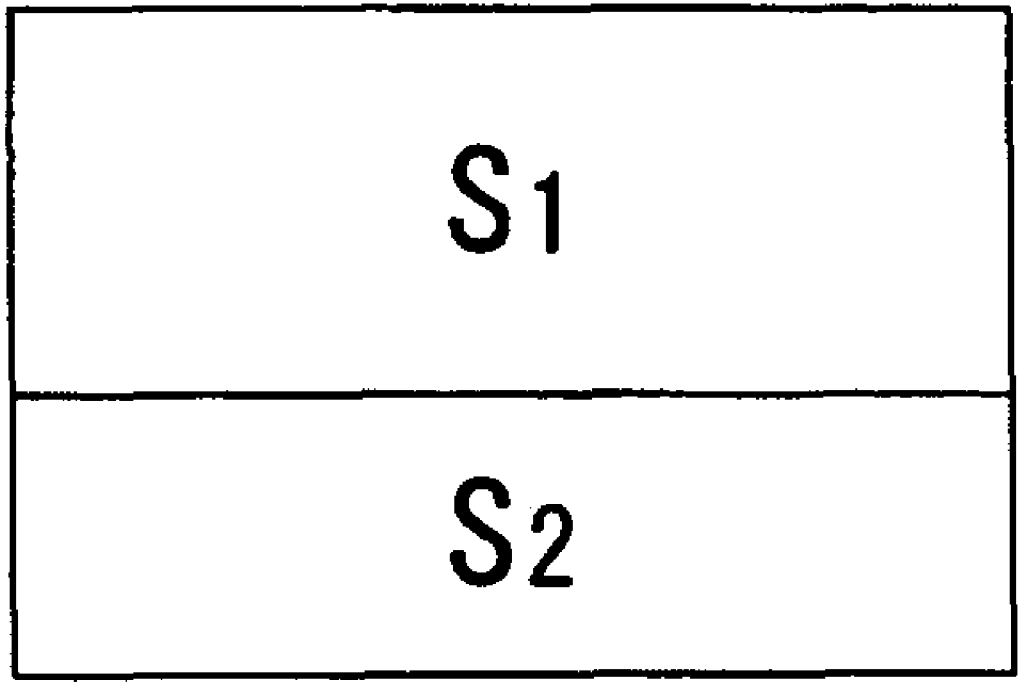
FIG. 7 is a diagram showing an example of a method of generating division data by an information spatial-division unit according to the second embodiment of the invention.

FIG. 7 is a diagram showing an example of a method of generating division data by the information spatial division unit 2362A. Specifically, FIG. 7 is a diagram showing an image based on the processed image data of one frame.

More specifically, the information spatial division unit 2362A recognizes the information about the number of the information transmission devices 4 to be used and the information about the transmission speeds according to the standards of the information transmission devices 4. For example, when the number of the information transmission devices 4 to be used is two of the information transmission devices 4A and 4B, the transmission speed of the information transmission device 4A is V1, and the transmission speed of the information transmission device 4B is V2 lower than V1, the information spatial division unit 2362A generates the division data as follows.

That is, as shown in FIG. 7, when the total region of an image based on the processed image data of one frame is S (S=S1+S2), the information spatial division unit 2362A divides the processed image data of one frame into data having a region of an region S1 and data having a region of an region S2 according to a ratio between V1 and V2, that is, divides the processed image data of one frame to satisfy the condition V1:V2=S1:S2, and generates the data as the division data.

FIG. 8 is a diagram showing an example of a data structure of the division data generated by the information spatial division unit 2362A.

As the data structure of the division data to be generated by the information spatial division unit 2362A, as shown in FIG. 8, a data structure that has information about a write position and a write length described in a header region and has color data corresponding to the pixels after the header region can be used.

The transmission allocation unit 2363A allocates the division data generated by the information spatial division unit 2362A to the data conversion circuits 2311 and 2312 of the transmitting/receiving unit 231, respectively, on the basis of the information about the number of the information transmission devices 4 to be used and the information about the transmission speeds accordance to the standards of the information transmission devices 4. Then, the transmission allocation unit 2363A causes the division data to be transmitted to the projector 3 through the information transmission devices 4 at a predetermined timing.

More specifically, as described above, when the number of the information transmission devices 4 is two of the information transmission devices 4A and 4B, the transmission speed of the information transmission device 4A is V1, the transmission speed of the information transmission device 4B is V2, and first division data having a region of an region S1 and second division data having a region of an region S2 are generated by the information spatial division unit 2362A, the transmission allocation unit 2363A allocates the first division data to the first data conversion circuit 2311 corresponding to the information transmission device 4A and allocates the second division data to the second data conversion circuit 2312 corresponding to the information transmission device 4B. Then, the first and second division data are transmitted to the projector 3 through the information transmission devices 4A and 4B, respectively, at a predetermined timing.

The image information generation unit 3241 of the projector 3 recognizes the write position of the division data on the basis of the header regions of the division data to be sequentially stored in the storage units 3231 and 3232, respectively, then reads out the division data so as to generate the processed image data of one frame, and subsequently outputs the processed image data of one frame to the liquid crystal panel driving control unit 3242. The liquid crystal panel driving control unit 3242 outputs a driving signal based on the processed image data to be output from the image information generation unit 3241 and causes the liquid crystal light valve 312 to form the optical image based on the processed image data.

Moreover, the operation of the projection system 1 is the same as the first embodiment, excluding a processing structure of the information transmission control unit 2361A and a processing structure of the image information generation unit 3241, as described above. That is, this embodiment is the same as the first embodiment, excluding Steps S3, S4, and S7 in FIG. 4 described in the first embodiment.

In the above-described second embodiment, the following effects are obtained, in addition to the same effects as the first embodiment.

Figure 9:
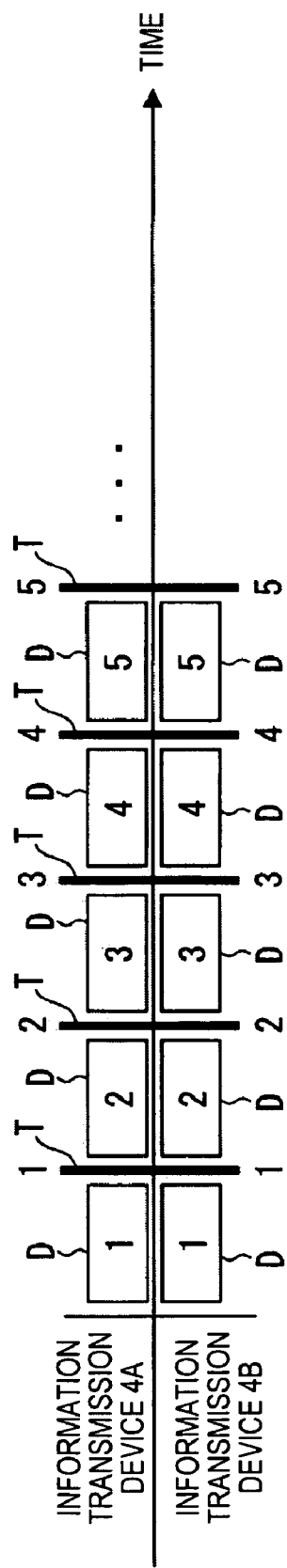
FIG. 9 is a diagram illustrating an effect of the second embodiment of the invention.

FIG. 9 is a diagram illustrating the effects of the second embodiment.

In this embodiment, the information transmission control unit 2361A divides the processed image data for each predetermined region on the display region so as to generate the plurality of division data. Accordingly, the division data are allocated to the data conversion circuits 2311 and 2312, respectively, and thus the division data can be transmitted to the projector 3 in parallel through the information transmission devices 4A and 4B, respectively. Then, in the projector 3, the image information generation unit 3241 reads out the division data to be sequentially stored in the storage units 3231 and 3232 and generates the processed image data, such that an image based on the processed image data can be displayed. In such a manner, with the information transmission devices 4A and 4B, the amount of data to be transmitted is reduced, and smooth data transmission can be performed.

When the plurality of division data obtained by dividing the processed image data for each predetermined region are transmitted to the projector 3 through the information transmission devices 4A and 4B, respectively, it is preferable that the transfer times of the division data through the information transmission devices 4A and 4B be the same. For example, when the transmission speed V1 of the information transmission device 4A from the information transmission devices 4A and 4B is higher than the transmission speed V2 of the information transmission device 4B, the transfer time of one division data transmitted through the information transmission device 4A among the division data becomes smaller than the transfer time of other division data transmitted through the information transmission device 4B. Then, in the projector 3, one division data among the division data and other division data are stored at different timings. After other division data are stored, the protector 3 reads out the division data from the storage units 3231 and 3232, then generates the processed image data, and subsequently causes an image to be displayed. Therefore, as described above, when the transmission speeds of the information transmission devices 4A and 4B are different from each other, it is necessary to transmit the division data through the information transmission device 4A having a nigh transmission speed in consideration with the transfer time of the division data through the information transmission device 4B having a low transmission speed. That is, the use time of the information transmission device 4A having a high transmission speed becomes shorter (the stop state becomes longer) and thus the performance of the information transmission devices 4A and 4B cannot be sufficiently utilized.

In this embodiment, the information transmission control unit 2361A divides the processed image data for each region at the ratio of the transmission speeds V1 and V2 according to the standards of the information transmission devices 4A and 4B so as to generate the division data. Further, the information transmission control unit 2361A transmits the division data having a large data amount to the projector 3 through the information transmission device 4A having a high transmission speed, and transmits the division data having a small data amount to the projector 3 through the information transmission device 4B having a low transmission speed. In such a manner, as shown in FIG. 9, the transfer times of the division data D through the information transmission devices 4A and 4B can be the same. That is, as shown in FIG. 9, when the information transmission control unit 2361A sequentially transmits the division data through the information transmission devices 4A and 4B at the same timing, in the projector 3, the division data are stored at the same timing. After being stored at the same timing, the division data are read out from the storage units 3231 and 3232, and the processed image data is generated. Then, the image based on the processed image data can be displayed. Therefore, even though the transmission speeds of the information transmission devices 4A and 4B are different from each other, the use times of the information transmission devices 4A and 4B are the same, without making the use time of the information transmission device 4A having a high transmission speed shorter than the use time of the information transmission device 4B having a low transmission speed. As a result, the performance of the information transmission devices 4A and 4B can be sufficiently utilized.

Third Embodiment

Next, a third embodiment of the invention will be described with reference to the drawings.

In the following description, the same parts as those described above are represented by the same reference numerals and the descriptions thereof will be omitted.

Figure 10:
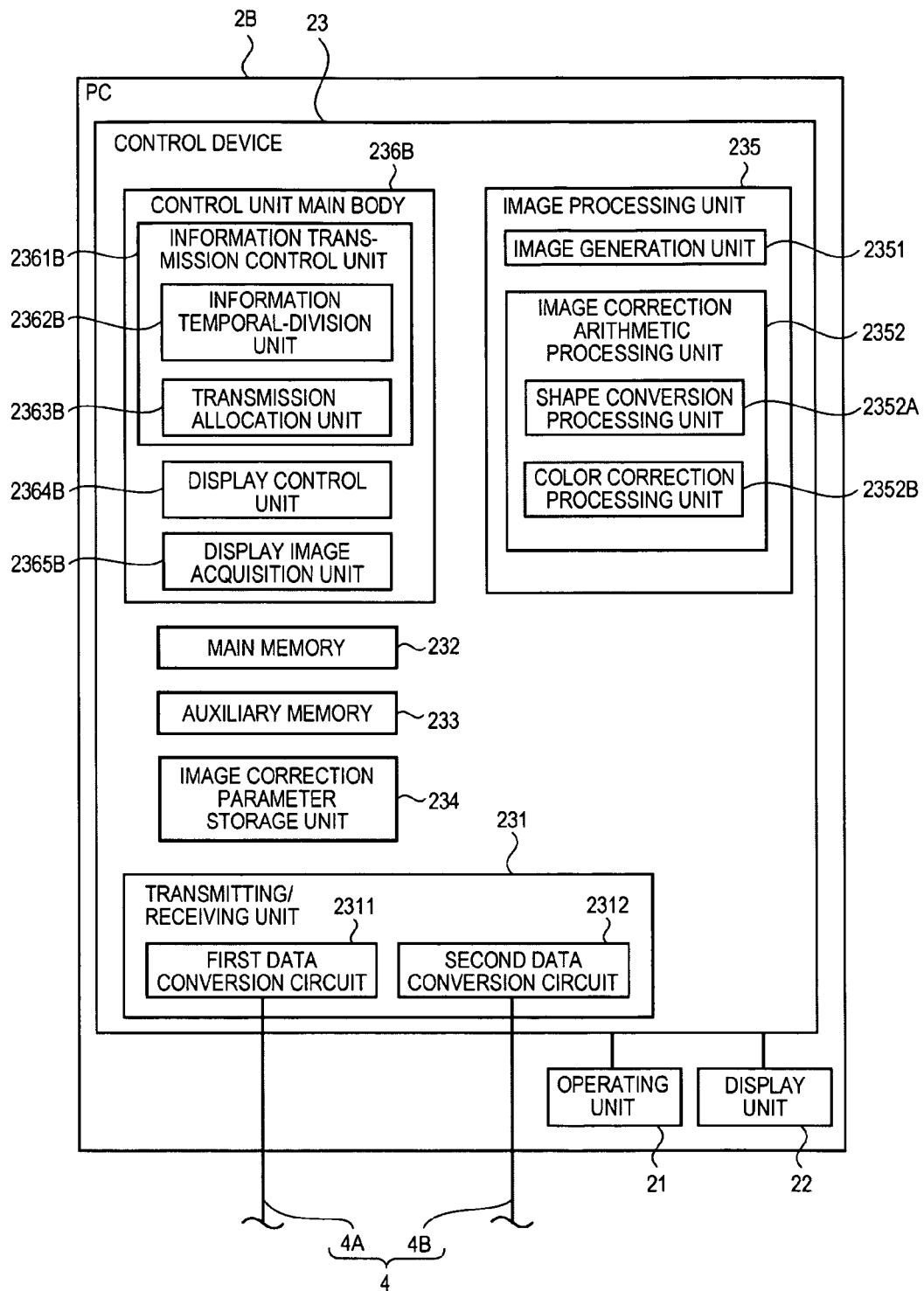
FIG. 10 is a block diagram showing the schematic configuration of a PC according to a third embodiment of the invention.

FIG. 10 is a block diagram showing the schematic configuration of a PC 2B according to the third embodiment of the invention.

In the second embodiment, the information transmission control unit 2361A of the control unit main body 236A constituting the PC 2A spatially (regionally) divides the processed image data (image information) of one frame on the basis of the information about the number of the information transmission devices 4 to be used and the information about the transmission speeds according to the standards of the information transmission devices 4 so as to generate the plurality of division data.

In contrast, in the third embodiment, as shown in FIG. 10, a control unit main body 236B constituting the PC 2B includes a display control nit 2364B that controls driving of the display unit 22 and enables display a plurality of programs or data in predetermined regions (windows) of the display unit 22 on the same screen (so-called multi-window system), a display image acquisition unit 2365B that acquires display image data displayed on the display unit 22, and an information transmission control unit 2361B that divides the display image data for each window so as to generate a plurality of division data and causes the plurality of generated division data to be transmitted to the projector 3 by the transmitting/receiving unit 231. That is, this embodiment is the same as the second embodiment, excluding that the display control unit 2364B and the display image acquisition unit 2365B are additionally provided in the PC 2B and a processing structure of the information transmission control unit 2361B is different.

Figure 11A:
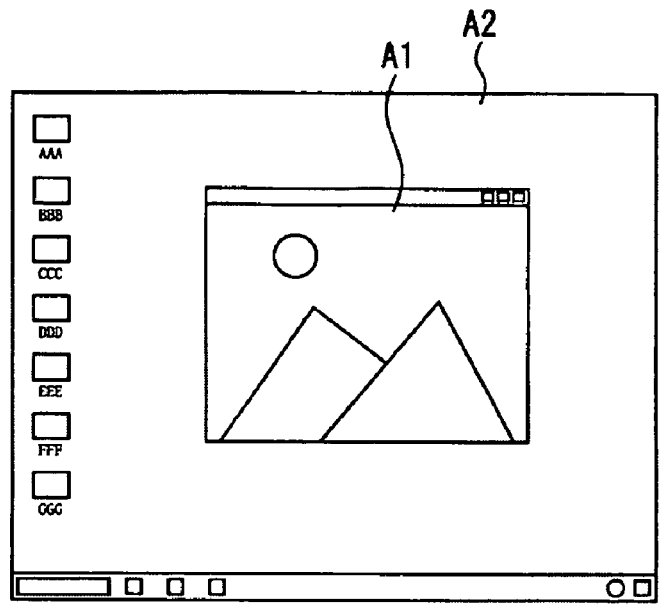
FIGS. 11A and 11B are diagrams showing an example of a method of generating division data by an information spatial-division unit according to the third embodiment of the invention.
Figure 11B:
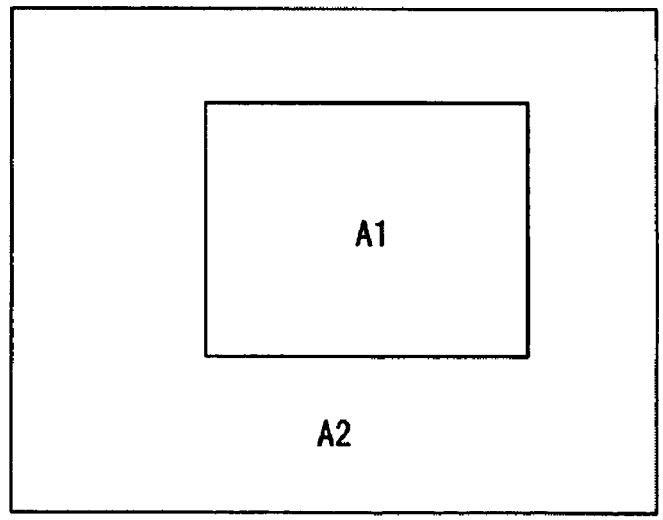

FIGS. 11A and 11B are diagram showing an example of a method of generating division data by an information spatial division unit 2362B.

The display control unit 2364B controls driving of the display unit 22 according to a predetermined program through the operation of the operating unit 21. For example, as shown in FIG. 11A, the display control unit 2364B causes a motion picture or the like to be displayed in a specific window region A1 of the display unit 22 and causes a background image or the like to be displayed in another region A2.

When a setting input purporting that 'the projector 3 displays the image displayed on the display unit 22' is made through the operation of the operating unit 21, the display image acquisition unit 2365B sequentially acquires the display image data displayed on the display unit 22, and then sequentially stores the acquired display image data in the main memory 232 or the like. The display image data that are sequentially stored in the main memory 232 or the like is subject to an image processing, such as a shape conversion processing and a color correction processing, by the image processing unit 235. The image processing unit 235 sequentially stores processed display image data subjected to the image processing in the main memory 232 or the like.

As shown in FIG. 10, the information transmission control unit 2361B includes an information spatial division unit 2362B and a transmission allocation unit 2363B.

The information spatial division unit 2362B recognizes the window of the display image that is displayed on the display unit 22. For example, in a case of an example shown in FIG. 11A, as shown in FIG. 11B, the information spatial division unit 2362B recognizes the specific window region A1 where the motion picture or the like is displayed and the background region A2 where the background image or the like is displayed. Then, the information spatial division unit 2362B divides the processed display image data stored in the main memory 232 or the like into data corresponding the specific window region A1 and data corresponding to the background region A2, and generates the data as the division data.

As the data structure of the division data, the same data structure as the second embodiment (for example, the data structure shown in FIG. 8 or the like) can be used.

The transmission allocation unit 2363B allocates the division data generated by the information spatial division unit 2362B to the data conversion circuits 2311 and 2312 of the transmitting/receiving unit 231, respectively, on the basis of the information about the transmission speeds according to the standards of the information transmission devices 4 stored in the main memory 232 or the like in advance, and causes the division data to be transmitted to the projector 3 through the information transmission devices 4 at a predetermined timing. For example, when the transmission speed of the information transmission device 4A from the information transmission devices 4A and 4B to be used is higher than the transmission speed of the information transmission device 4B, the transmission allocation unit 2363B allocates the first division data corresponding to the specific window region A1 to the first data conversion circuit 2311 corresponding to the information transmission device 4A and allocates the second division data corresponding to the background region A2 to the second data conversion circuit 2312 corresponding to the information transmission device 4B. Then, the first and second division data are transmitted to the projector 3 through the information transmission devices 4A and 4B, respectively, at a predetermined timing.

In the projector 3, the same processing as the second embodiment is performed. Then, the optical image based on the processed display image data is formed by the liquid crystal light valve 312.

The operation of the projection system 1 in this embodiment is the same as the second embodiment, excluding that, the display control unit 2364B and the display image acquisition unit 2365B are additionally provided in the PC 2B and the processing structure of the information transmission control unit 2361B is different, as described above. That is, this embodiment is the same as the second embodiment, excluding Steps S1, S3, and S4 in FIG. 4 described in the second embodiment.

In the above-described third embodiment, the following effects are obtained, in addition to the same effects as the second embodiment.

Figure 12:
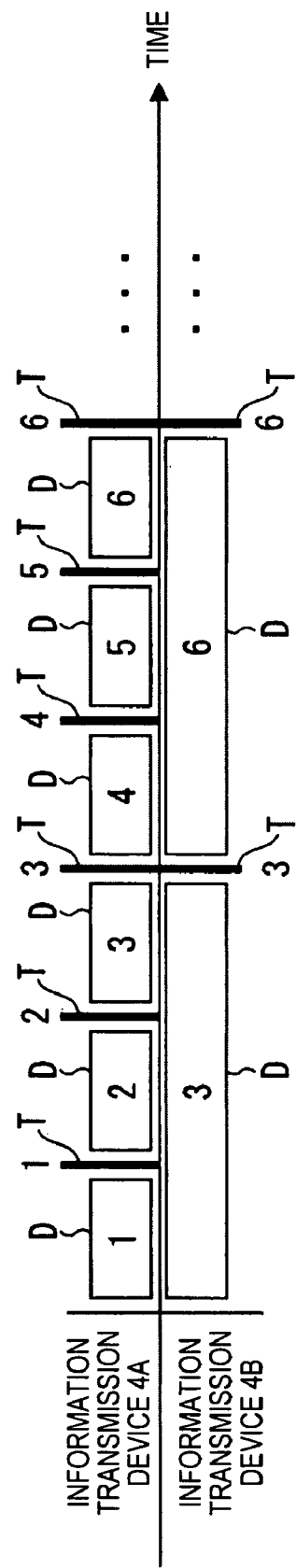
FIG. 12 is a diagram illustrating an effect of the third embodiment of the invention.

FIG. 12 is a diagram illustrating the effects of the third embodiment.

When a multi-window system is used for the PC 2B, in the specific window region A1, there is a high possibility that an image frequently changes. Further in the background region A2, there is a low possibility that an image frequently changes.

In this embodiment, the PC 2B includes the display control unit 2364B and is configured as a multi-window system. Further, the PC 2B acquires the display image data relative to the image displayed on the display region of the display unit 22, then performs a predetermined image processing on the display image data, and subsequently transmits the processed display image data to the projector 3. Then, the projector 3 displays an image based on the processed display mage data (the image displayed on the display region of the display unit 32). Here, the information transmission control unit 2361B divides the processed display image data into the data corresponding to the specific window region A1 and the background region A2 and generates the data as the division data. Thereafter, as shown in FIG. 12, the information transmission control unit 2361B causes the division data corresponding to the specific window region A1 to be transmitted through the information transmission device 4A having a higher transmission speed from the information transmission devices 4A and 4B. Further, as shown in FIG. 12, the information transmission control unit 2361B causes the division data D corresponding to the background region A2 to be transmitted through the information transmission device 4B having a lower transmission speed. In such a manner, as shown in FIG. 12, in the projector 3, the image based on the division data corresponding to the specific window region A1 having a high possibility that an image frequently changes can be updated at a shorter display timing T than the image based on the division data corresponding to the background region A2 having a low possibility that an image frequently changes. Therefore, the performance of the information transmission devices 4A and 4B can be appropriately used, and thus the projector 3 can favorably display the image displayed on the display region of the display unit 22.

In the above-described configuration, for example, the content of the image processing (shape conversion processing or color correction processing) to be performed in the specific window region A1 and the background region A2 by the image processing unit 235 or the precision of the color data for each pixel can be changed. That is, the content of the image processing is changed according to a motion picture, a still picture, a background or the like.

For example, when a motion picture is displayed in the specific window region A1, it is preferable to rapidly perform the update. At this time, in the image processing unit 235, the minimum image processing, such as color correction or motion blurring processing is performed such that, as for the data corresponding to the specific window region A1 among the display image data, the frame rate of the display image on the projector 3 is not reduced due to a time required for the image processing.

Further, when a sill picture is displayed in the specific window region A1, the update does not need to be rapidly performed, excluding a case where the image changes. For this reason, the image processing unit 235 performs the minimum correction on the data corresponding to the specific window region A1 among the display image data, and performs detailed correction as time lapses so as to develop the data to a high-definition image. According to this configuration, the high-definition image can be developed by efficiently using the information transmission device 4A allocated to the specific window region A1 with no stop, and by repeating the image processing on the specific window region A1 at free time of other image processing several times in an overlap manner. Therefore, a processing load of the PC 2B can be reduced.

As the image processing on the data corresponding to the specific window region A1 among the display image data when the still picture is displayed in the specific window region A1, correction, such as red-eye correction or backlight correction, for correcting the image closer to a natural landscape than data on an original still picture file is preferably used when the still picture is a photograph. At this time, as for a new correction result, the amount of data to be transmitted can be reduced by transmitting a difference in a color space of each pixel or only differential data corresponding to a chance region when an image to be displayed changes.

Fourth Embodiment

Next, a fourth embodiment of the invention will be described with reference to the drawings.

In the following description, the same parts as those described above are represented by the same reference numerals, and the descriptions thereof will be omitted.

Figure 13:
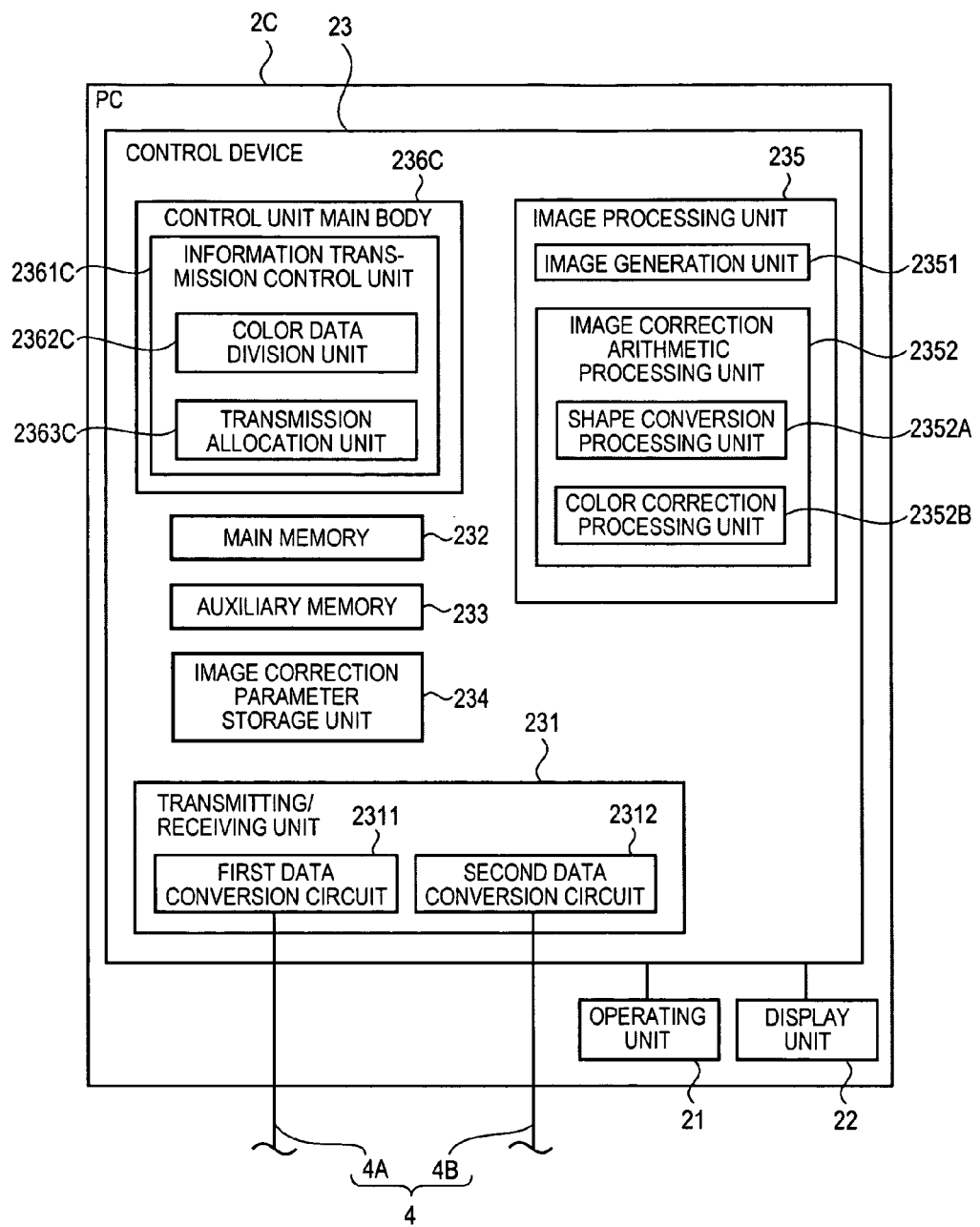
FIG. 13 is a block diagram showing the schematic configuration of a PC according to a fourth embodiment of the invention.

FIG. 13 is a block diagram showing the schematic configuration of a PC 2C according to the fourth embodiment of the invention.

In the first embodiment, the information transmission control unit 2361 of the control unit main body 236 constituting the PC 2 divides the processed image data of several frames in the temporal direction, that is, for each frame so as to generate the plurality of division data (processed image data of one frame).

In contrast, in the fourth embodiment, an information transmission control unit 2361C of a control unit main body 236C constituting the PC 2C divides color data for each pixel included in the processed image data so as to generate a plurality of division data. That is, this embodiment is the same as the first embodiment, excluding a processing structure of the information transmission control unit 2361C of the PC 2C.

As shown in FIG. 13, the information transmission control unit 2361C includes a color data division unit 2362C and a transmission allocation unit 2363C.

The color data division unit 2362C divides the color data for each pixel included in the processed image data (image information) of one frame stored in the main memory 232 on the basis of the information about the number of the information transmission devices 4 to be used and the information about the transmission speeds according to the standards of the information transmission devices 4 stored in the main memory 232 or the like in advance so as to generate the plurality of division data. That is, the color data division unit 2362C divides the color data into main partial precision data having a predetermined length of upper bits and detailed partial precision data having a predetermined length of lower bits so as to generate the plurality of division data.

Moreover, the information about the number of the information transmission devices 4 to be used is not limited to a case where it is stored in the main memory 232 or the like in advance. For example, the information may be set and input by the operation of the operating unit 21. Alternatively, when the information is transmitted to the protector 3 in a wired manner, for example, through a USB cable or a LAN cable, the number of cables to be connected may be detected and recognized by the control unit main body 236C.

Figure 14A:
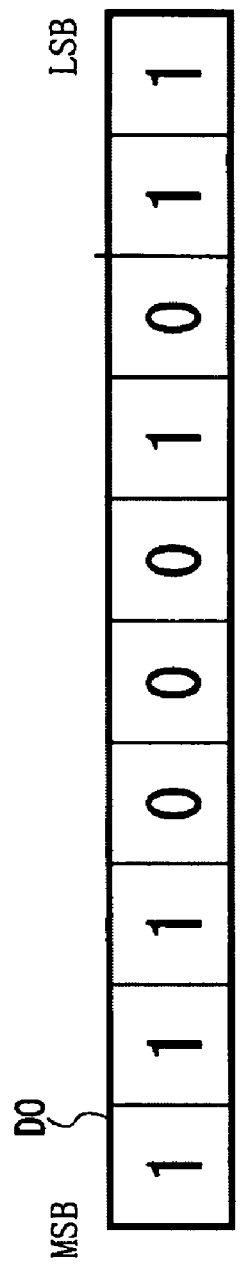
FIGS. 14A and 14B are diagrams showing an example of a method of generating division data by a color data division unit according to the fourth embodiment of the invention.
Figure 14B:
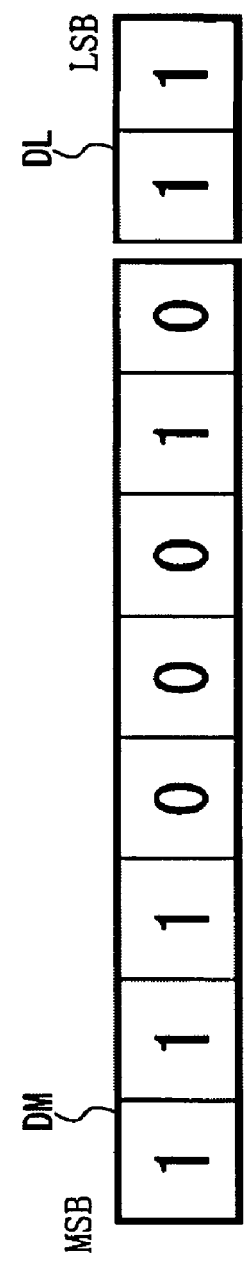

FIGS. 14A and 14B are diagrams showing an example of a method of generating division data by the color data division unit 2362C.

For example, when the number of the information transmission devices 4 to be used is two of the information transmission devices 4A and 4B, and the transmission speed of the information transmission device 4A is higher than the transmission speed of the information transmission device 4B, and the color data for each pixel included in the processed image data is 10-bit data, as shown in FIGS. 14A and 14B, the color data division unit 2362C divides 10-bit color data D0 for each pixel included in the processed image data into main partial precision data DM having a length of upper eight bits and detailed partial precision data DL having a length of lower two bits so as to generate two division data including the main partial precision data DM and the detailed partial precision data DL, respectively.

Here, while a gray-scale value in the color data D0 shown in FIG. 14A is 907 (a total gray-scale value is 1024) a gray-scale value in the main partial precision data DM shown in FIG. 14B is 206 (a total gray-scale value is 256). That is, the main partial precision data DM has a gray-scale value of 904 when the total gray-scale value is 1024, and a difference from the gray-scale value of the color data D0 becomes very small. It is important to determine the color data.

The transmission allocation unit 2363C allocates the division data generated by the color data division unit 2362C to the data conversion circuits 2311 and 2312 of the transmitting/receiving unit 231 on the basis of the information about the number of the information transmission devices 4 to be used and the information about the transmission speeds according to the standards of the information transmission devices 4 to be then transmitted to the projector 3 through the information transmission devices 4 at a predetermined timing.

More specifically, as described above, when the number of the information transmission devices 4 to be used is two of the information transmission devices 4A and 4B, the transmission speed of the information transmission device 4A is higher than the transmission speed of the information transmission device 4B, and the first division data including the main partial precision data having a length of upper eight bits and the second division data including the detailed partial precision data including a length of lower two bits are generated by the color data division unit 2362C, the transmission allocation unit 2363C allocates the first division data to the first data conversion circuit 2311 corresponding to the information transmission device 4A and allocates the second division data to the second data conversion circuit 2312 corresponding to the information transmission device 4B. Then, the first and second division data are transmitted to the projector 3 through the information transmission devices 4, respectively, at a predetermined timing.

The image information generation unit 3241 of the projector 3 reads out the division data to be sequentially stored in the storage units 3231 and 3232 so as to generate the processed image data having the color data D0 having a predetermined bit length (in the example shown in FIGS. 14A and 14B, a length of ten bits), and outputs the generated processed image data to the liquid crystal panel driving control unit 3242. The liquid crystal panel driving control unit 3242 outputs a driving signal based on the processed image data output from the image information generation unit 3241 to the liquid crystal light valve 312. Then, the liquid crystal light valve 312 forms an optical image based on the processed image data.

The operation of the projection system 1 in this embodiment is the same as the first embodiment, excluding the processing structure of the information transmission control unit 2361C and the processing structure of the image information generation unit 3241, as described above. That is, this embodiment is the same as the first embodiment, excluding Steps S3, S4, and S7 in FIG. 4 described in the first embodiment.

In the above-described fourth embodiment, the following effects are obtained, in addition to the same effects as the first embodiment.

If a predetermined image processing, for example, a color correction processing is performed on the image data using a graphic processing function by the image processing unit 235 of the PC 2C, for example, the color data having 8-bit precision for each original pixel can be converted to color data having 10-bit precision or more for each pixel. That is, the processed image data including such high-definition color data can be transmitted to the projector 3 and displayed thereon, and thus a high-definition image can be displayed. However, since the number of bits of the color data increases, the amount of data to be transmitted to the projector 3 through the information transmission devices increases, and thus smooth data transmission is rarely performed.

In this embodiment, the information transmission control unit 2361C divides the color data for each pixel included in the processed image data at a predetermined bit length so as to generate the plurality of division data. Accordingly, the division data can be allocated to the data conversion circuits 2311 and 2312, respectively, to be then transmitted to the projector 3 in parallel through the information transmission devices 4A and 4B. Then, in the projector 3, the image information generation unit 3241 reads out the division data stored in the storage units 3231 and 3232 and generates the processed image data. Then, the image based on the processed image data is displayed. That is, since the data amount of the information (division data) to be transmitted is reduced, smooth information transmission can be performed, and a high-definition image can be displayed on the projector 3.

Here, the information transmission control unit 2361C divides the color data into the main partial precision data having a length of several bits from the uppermost bit, which are important to determine color information of each pixel, and the detailed partial precision data having a different bit length so as to generate the division data. Then, the information transmission control unit 2361C transmits the division data having the main partial precision data required at the minimum through one of the information transmission devices 4A and 4B, and the projector 3 displays an image with precision required at the minimum. Further, the division data having the detailed partial precision data through the other information transmission device is transmitted to the projector 3. Then, the projector 3 displays a higher definition image on the basis of the main partial precision data and the detailed partial precision data. According to this configuration, since a user appropriately selects the information transmission device to use, the precision of the image to be displayed on the projector 3 can be changed. Therefore, convenience of the projection system 1 can be improved.

Fifth Embodiment

Next, a fifth embodiment of the invention will be described with reference to the drawings.

In the following description, the same parts as those described above are represented by the same reference numerals, and the descriptions thereof will be omitted.

Figure 15:
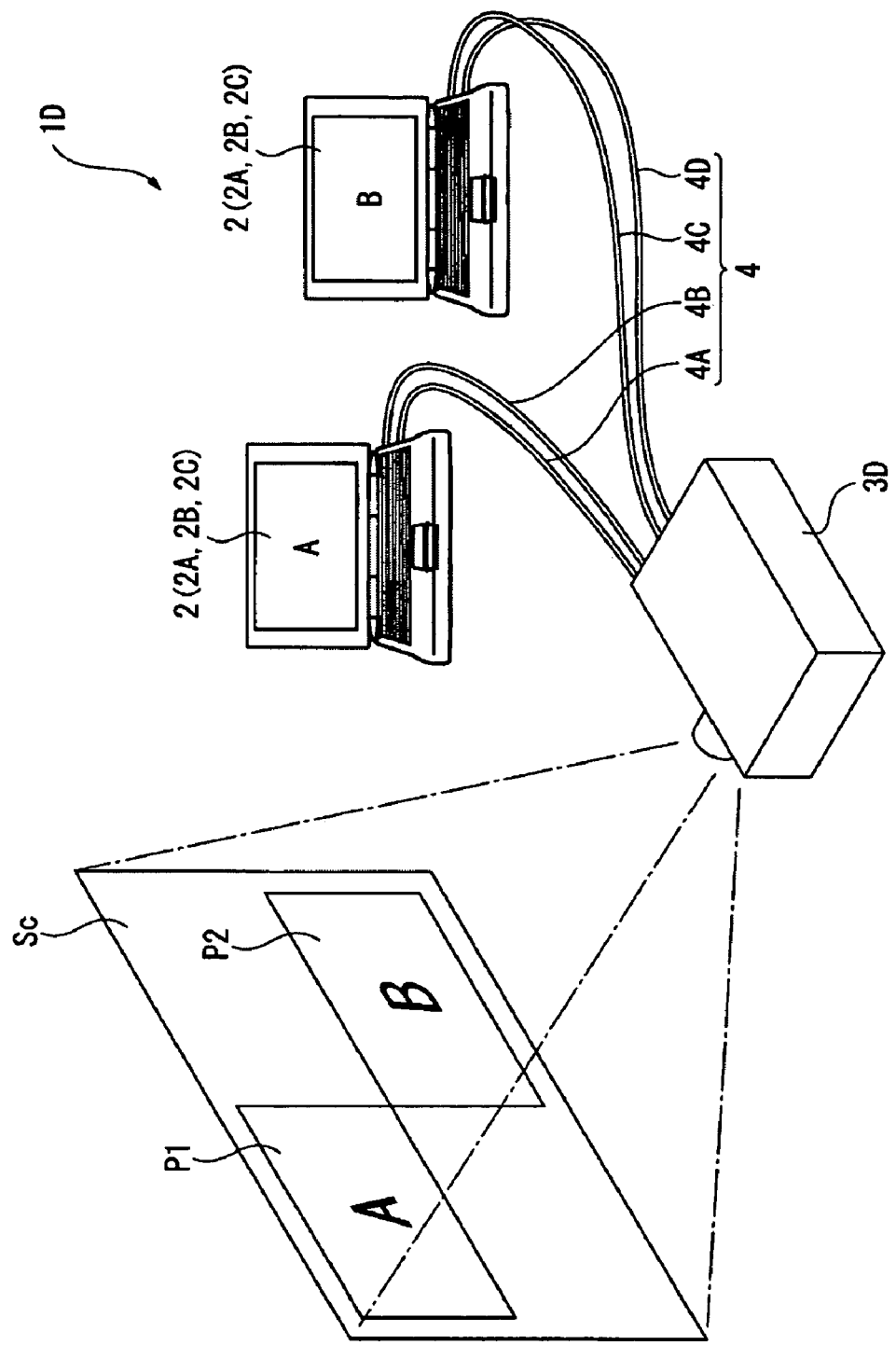
FIG. 15 is a block diagram showing the schematic configuration of a projection system according to a fifth embodiment of the invention.

FIG. 15 is a block diagram showing the schematic configuration of a projection system 1D according to the fifth embodiment of the invention.

In the first to fourth embodiments, the projection system 1 has only one PC 2 (2A, 2B, or 2C) that is connected to the projector 3 through the information transmission devices 4.

In contrast, in the fifth embodiment, as shown in FIG. 15, the projection system 1D has a plurality (in the example shown in FIG. 15, two) of PCs 2 (2A, 2B, or 2C) that are connected to a projector 3D through the information transmission devices 4. Then, as shown in FIG. 15, the projector 3D displays images based on image data transmitted from the PCs 2 (2A, 28, or 2C) at predetermined positions P1 and P2, respectively. That is, this embodiment is the same as the first to fourth embodiments, excluding the number of the PCs in the projection system 1D, and processing structures of a transmitting/receiving unit 321D, an information storage unit 323D, and an image information generation unit 3241D in the projector 3D.

In this embodiment, the number of the information transmission devices 4 corresponds to the number of the PCs 2 (2A, 2B, or 2C) connected to the projector 3D. That is, in the example shown in FIG. 15, as the information transmission devices 4, four information transmission devices 4A, 4B, 4C, and 4D are provided. Moreover, in the example shown in FIG. 15, one PC 2 (2A, 2B, or 2C) of the two PCs 2 (2A, 2B, or 2C) and the projector 3D are connected to each other through the two information transmission devices 4A and 4B. Further, the other PC 2 (2A, 2B, or 2C) and the projector 3D are connected to each other through the two information transmission devices 4C and 4D.

Figure 16:
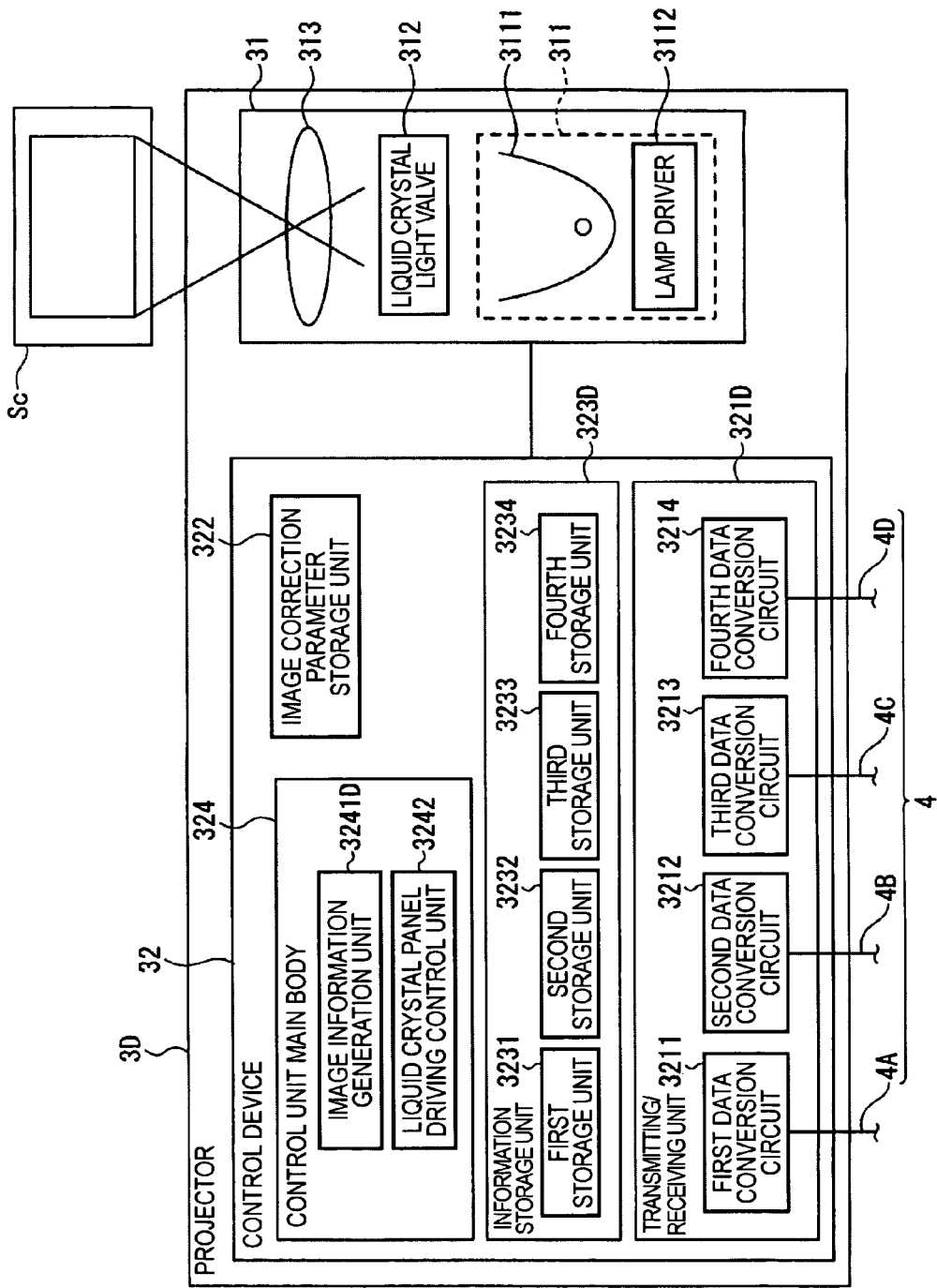
FIG. 16 is a block diagram showing the schematic configuration of a projector according to the fifth embodiment of the invention.

FIG. 16 is a block diagram showing the schematic configuration of a projector 3D according to the fifth embodiment of the invention.

The transmitting/receiving unit 321D has the same configuration as the transmitting/receiving unit 321 described in the first embodiment. The transmitting/receiving unit 321D has data conversion circuits corresponding to the number of the PCs 2 (2A, 2B, or 2C) to be connected to the projector 3D. That is, in the example shown in FIGS. 15 and 16, the transmitting/receiving unit 321D includes four data conversion circuits 3211, 3212, 3213, and 3214 as information receiving units.

In this embodiment, as shown in FIG. 16, the data conversion circuit that performs data transmission and reception through the information transmission device 4A is referred to as a first data conversion circuit 3211, and the data conversion circuit that performs data transmission and reception through the information transmission device 4B is referred to as a second data conversion circuit 3212. Further, the data conversion circuit that performs data transmission and reception through the information transmission device 4C is referred to as a third data conversion circuit 3213, and the data conversion circuit that performs data transmission and reception through the information transmission device 4D is referred to as a fourth data conversion circuit 3214.

The information storage unit 323D has the same configuration as the information storage unit 323 described in the first embodiment. The information storage unit 323D has storage units corresponding to the data conversion circuits constituting the transmitting/receiving unit 321D. That is, in the example shown in FIGS. 15 and 16, the information storage unit 323D has four storage units 3231, 3232, 3233, and 3234 corresponding to the four data conversion circuits 3211, 3212, 3213, and 3214.

In this embodiment, as shown in FIG. 15, the storage unit that stores data received by the first data conversion circuit 3211 is referred to as a first storage unit 3231, and the storage unit that stores data received by the second data conversion circuit 3212 is referred to as a second storage unit 3232.

Further, the storage unit that stores data received by the third data conversion circuit 3213 is referred to as a third storage unit 3233, and the storage unit that stores data received by the fourth data conversion circuit 3214 is referred to as a fourth storage unit 3234. Further, as the storage units 3233 and 3234, like the storage units 3231 and 3232, for example, VRAM or the like can be used.

The image information generation unit 3241D generates image data (hereinafter, referred to as first image data) on the basis of the division data to be sequentially stored in the storage units 3231 and 3232, as described in the first to fourth embodiments. Similarly, the image information generation unit 3241D generates image data (hereinafter, referred to as second image data) on the basis of the division data to be sequentially stored in the storage units 3233 and 3234. Then, the image information generation unit 3241D locates the first image data and the second image data at specific positions, respectively, so as to generate display image data, and outputs the generated display image data to the liquid crystal panel driving control unit 3242. The liquid crystal panel driving control unit 3242 outputs a driving signal based on the display image data output from the image information generation unit 3241D to the liquid crystal light valve 312, and the liquid crystal light valve 312 forms an optical image based on the display image data. Then, like the example shown in FIG. 15, an image A based on the first image data and an image B based on the second image data are located and displayed at specific positions on the screen Sc.

Moreover, the operation of the projection system 1D is the same as the first to fourth embodiments, excluding the number of the PCs in the projection system 1D and the processing structure of the image information generation unit 3241D in the projector 3D, as described above. That is, this embodiment is the same as the first to fourth embodiments, excluding Step S8 in FIG. 4 described in the first to fourth embodiments.

In the above-described fifth embodiment, the following effects are obtained, in addition to the same effects as the first to fourth embodiments.

In this embodiment, the images based on the processed image data transmitted from the PCs 2 (2A, 2B, or 2C) connected to the projector 3D can be displayed in predetermined regions on the display region. Accordingly, the images can be displayed according various display modes, and thus convenience of the projection system 1D can be improved.

The invention is not limited to the above-described embodiments, but various modifications and improvements that are made without departing the spirit of the invention still fall within the scope of the invention.

In the embodiments, the PC 2 (2A, 2B, or 2C) divides the processed image data so as to generate the plurality of division data, and the division data is allocated to the information transmission devices 4A and 4B to be then transmitted. Alternatively, one of a method of generating a plurality of division data and transmitting the generated division data in parallel and a method of transmitting processed image data as it is with no division may be selected according to a kind of a video source to be displayed on the projector 3.

That is, in the fifth embodiment, when the processed image data is transmitted as it is with no division, instead of using the four information transmission devices 4A, 4B, 4C, and 4D as the information transmission devices 4, two information transmission devices, that is, one of the information transmission devices 4A and 4B and one of the information transmission devices 4C and 4D may connect the PCs (2A, 2B, or 2C) and the projector 3.

In the embodiments, a difference corresponding to change of the division data before and after transmission (division data transmitted previously and division data to be subsequently transmitted) may be calculated, and differential data relative to the difference may be transmitted as division data. For example, in a case of the first embodiment, differential data relative to a difference corresponding to a change between the division data (processed image data for each frame) transmitted through one of the information transmission devices 4A and 4B and the division data (processed image data for each frame) transmitted through the other information transmission device is transmitted through the other information transmission device. Further, in a case or the second to fourth embodiments, differential data relative to a difference corresponding to a change between the division data transmitted previously through the information transmission device 4A and the division data to be subsequently transmitted is transmitted as the division data. Further, differential data relative to a difference corresponding to a change between the division data transmitted previously through the information transmission device 4B and the division data to be subsequently transmitted is transmitted as the division data.

Embodiments that are implemented by combinations of the above-described embodiments can be adopted.

In the embodiments, a transmissive liquid crystal panel (the liquid crystal light valve 312) is used. However, the invention is not limited thereto. For example, a reflective liquid crystal panel or Digital Micromirror Device (Trademark of Texas Instrument) may be used.

In the embodiments, three liquid crystal light values 312 are provided, but the invention is not limited thereto. A single liquid crystal light valve 312 or two liquid crystal light valves 312 may be provided. Further, four or more liquid crystal light valves 312 may be provided.

In addition, the best configurations for carrying out the invention are disclosed through the above descriptions, but the invention is not limited thereto. That is, although the invention is illustrated and described relative to the specific embodiments, as for the shapes, quality, quantity, and other detailed configuration in the embodiments, various modifications can be made by those skilled in the art without departing from the technical spirit and scope of the invention.

Therefore, the descriptions of the shapes, quality, and quantity disclosed above are illustrative for ease understanding of the invention, but are not intended to limit the invention. Descriptions relative to titles of members other than a part or all of the limitations of the shapes, quality, and the like still fall within the scope of the invention.

According to the invention, smooth information transmission can be performed, and a good display state of an mage can be realized. Accordingly, the invention can be applied to an image display system that uses a projector to be used for presentation or home theater.

The entire disclosure of Japanese Patent Application No. 2005-3558582, filed Dec. 13, 2005 is expressly incorporated by reference herein.

What is claimed is:
1. An image display system comprising:
an information processing apparatus that processes image information;
an image display device that displays an image based on the image information processed by the information processing apparatus;
a first information transmission device that connects the information processing apparatus and the image display device so as to enable information transmission and reception; and a second information transmission device that connects the information processing apparatus and the image display device so as to enable information transmission and reception, wherein the information processing apparatus includes:
an image processing unit that performs a predetermined image processing on the image information, and
an information transmission control unit that divides the image information processed by the image processing unit into a first division information corresponding to upper bits of the image information, the upper bits being main partial precision data, and a second division information corresponding to lower bits of the image information, the lower bits being detailed partial precision data, the detailed partial precision data having a different bit length than the main partial precision data;
a first information transmitting unit that transmits the first division information to the image display device through the first information transmission device, the first information transmission device having a first transmission speed, and
a second information transmitting unit that transmits the second division information to the image display device through the second information transmission device, the second information transmission device having a second transmission speed, the first transmission speed being higher than the second transmission speed, and the first information transmitting device transmits the first division information and the second information transmitting device transmits the second division information at different times, and wherein the image display device includes:
a first information receiving unit that receives the first division information transmitted from the information processing apparatus through the first information transmission device,
a second information receiving unit that receives the second division information transmitted from the information processing apparatus through the second information transmission device,
an information storage unit that has a first storage region for storing the first division information and a second storage region for storing the second division information,
an image information generation unit that reads out the first and second division information stored in the first and second storage regions of the information storage unit, and generates the processed image information, and
a display unit that displays an image based on the processed image information generated by the image information generation unit.

2. The image display system according to claim 1, wherein the information transmission control unit allocates the plurality of division information to the first and second information transmitting units to be then transmitted on the basis of transmission speeds according to the standards of the first and second information transmission devices.

3. The image display system according to claim 1, wherein a plurality of information processing apparatuses are provided and connected to the image display device through the first and second information transmission devices,
the image information generation unit allocates image information transmitted from the plurality of information processing apparatuses through the first and second information transmission devices to predetermined regions and generates display image information, and
the display device-side display control unit causes the display device-side display unit to display an image based on the display image information generated by the image information generation unit.

4. An image display method that uses an image display system including an information processing apparatus that processes image information, an image display device that displays an image based on the image information processed by the information processing apparatus, and a first information transmission device that connects the information processing apparatus and the image display device so as to enable information transmission and reception and a second information transmission device that connects the information processing apparatus and the image display device so as to enable information transmission and reception, the image display method causes the information processing apparatus to execute:
performing a predetermined image processing on the image information;
dividing processed image information subjected to the image processing and generating a first division information corresponding to upper bits of the image information, the upper bits being main partial precision data, and a second division information corresponding to lower bits of the image information, the lower bits being detailed partial precision data, the detailed partial precision data having a different bit length than the main partial precision data; and
allocating the first and second division information to the first and second information transmission devices so as to transmit the first and second division information to the image display device, the first information transmission device having a first transmission speed, the second information transmission device having a second transmission speed, the first transmission speed being higher than the second transmission speed, and the first information transmitting device transmits the first division information and the second information transmitting device transmits the second division information at different times, and
the image display method causes the image display device to execute:
receiving the first and second division information through the first and second information transmission devices;
storing the first and second received division information in first and second storage regions corresponding to the first and second information transmission devices;
reading out the first and second division information stored in the first and second storage regions and generating the processed image information; and
displaying an image based on the generated processed image information,
wherein an information transmission control unit performs the dividing of the processed image information into the first division information and the second division information.

5. An information processing apparatus that performs a processing on image information and transmits processed image information subjected to the processing to an image display device through a first information transmission device that connects the information processing apparatus and the image display device so as to enable information transmission and reception; and a second information transmission device that connects the information processing apparatus and the image display device so as to enable information transmission and reception, the information processing apparatus comprising:

a first information transmitting unit that transmits a first division information to the image display device through the first information transmission device, the first information transmission device having a first transmission speed;

a second information transmitting unit that transmits a second division information to the image display device through the second information transmission device, the second information transmission device having a second transmission speed, and the first information transmitting device transmits the first division information and the second information transmitting device transmits the second division information at different times; and an image processing unit that performs a predetermined image processing on the image information; and an information transmission control unit that divides the image information processed by the image processing unit into the first division information corresponding to upper bits of the image information, the upper bits being main partial precision data, and the second division information corresponding to lower bits of the image information, the lower bits being detailed partial precision data, the detailed partial precision data having a different bit length than the main partial precision data;

a display unit that displays an image based on the processed image information generated by the image information generation unit.

6. A non-transitory computer readable medium including control program instructions for an information processing apparatus that performs a processing on image information and transmits processed image information subjected to the processing to an image display device through a plurality of information transmission devices, the control program causes a computer incorporated into the information processing apparatus to execute:

performing a predetermined image processing on the image information;

dividing the processed image information subjected to the image processing and generating a first division information corresponding to upper bits of the image information, the upper bits being main partial precision data, and a second division information corresponding to lower bits of the image information, the lower bits being detailed partial precision data, the detailed partial precision data having a different bit length than the main partial precision data; and allocating the first and second division information the first and second information transmission devices of the plurality of information transmission devices so as to transmit the first and second division information to the image display device, the first information transmission device having a first transmission speed, the second information transmission device having a second transmission speed, the first transmission speed being higher than the second transmission speed, and the first information transmitting device transmits the first division information and the second information transmitting device transmits the second division information at different times;

wherein an information transmission control unit divides color data for each pixel to be represented by bits in the processed image information at a predetermined bit length so as to generate the first and second division information.

7. The image display system according to claim 1, wherein the upper bits have a length of 8 bits, and the lower bits have a length of 2 bits.

8. The image display system according to claim 1, wherein the information transmission control unit is capable of transmitting only the division data having the main partial precision data, making the projector display a minimum precision image, and transmitting the division data having the main partial precision data and the detailed partial precision data, making the projector display a high definition image.

* * * * *